(12) United States Patent
Kudo et al.

(10) Patent No.: US 11,594,067 B2
(45) Date of Patent: Feb. 28, 2023

(54) OBJECT COLLATION DEVICE

(71) Applicant: NEC CORPORATION, Tokyo (JP)

(72) Inventors: Yuta Kudo, Tokyo (JP); Rui Ishiyama, Tokyo (JP); Toru Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 784 days.

(21) Appl. No.: 16/486,352

(22) PCT Filed: Feb. 16, 2017

(86) PCT No.: PCT/JP2017/005733
§ 371 (c)(1),
(2) Date: Aug. 15, 2019

(87) PCT Pub. No.: WO2018/150519
PCT Pub. Date: Aug. 23, 2018

(65) Prior Publication Data
US 2019/0384961 A1 Dec. 19, 2019

(51) Int. Cl.
*G06T 7/00* (2017.01)
*G03B 15/00* (2021.01)
(Continued)

(52) U.S. Cl.
CPC .......... *G06V 40/1335* (2022.01); *G01J 3/524* (2013.01); *G03B 15/02* (2013.01);
(Continued)

(58) Field of Classification Search
CPC .......... G06V 40/1335; G06V 30/1423; G06V 30/142; G01J 3/524; G01J 3/0289;
(Continued)

(56) References Cited

U.S. PATENT DOCUMENTS 9,965,070 B2 * 5/2018 Vaillant ................. G06F 3/0412
10,482,361 B2 * 11/2019 Yanson et al. ......... G06K 19/06
(Continued)

FOREIGN PATENT DOCUMENTS

JP 2008-102676 A 5/2008
JP 4992375 B2 * 5/2008 ............... G07D 7/12
(Continued)

OTHER PUBLICATIONS

International Search Report for PCT/JP2017/005733, dated Apr. 18, 2017.

*Primary Examiner* — Gandhi Thirugnanam
*Assistant Examiner* — Michael Adam Shariff
(74) *Attorney, Agent, or Firm* — Sughrue Mion, PLLC

(57) ABSTRACT

An object management system includes an identifier generation device and an object collation device. The identifier generation device includes a generation unit that forms an ink layer on a target object, an imaging unit that images an uneven pattern on a surface of the ink layer, and a registration unit that registers the imaged result in a storage unit. The object collation device includes an imaging unit that images the uneven pattern on the surface of the ink layer formed on the target object, and a recognizing unit that recognizes the target object based on an image of the uneven pattern obtained by imaging.

7 Claims, 39 Drawing Sheets

(51) Int. Cl.

| | | |
|---|---|---|
| *H04N 5/225* | (2006.01) | |
| *H04N 5/232* | (2006.01) | |
| *G06V 40/12* | (2022.01) | |
| *G01J 3/52* | (2006.01) | |
| *G03B 15/02* | (2021.01) | |
| *G06K 9/00* | (2022.01) | |
| *H04N 1/60* | (2006.01) | |

(52) U.S. Cl.
CPC ....... *G06K 9/00496* (2013.01); *H04N 1/6033* (2013.01); *H04N 5/2254* (2013.01); *G06T 2207/10152* (2013.01)

(58) Field of Classification Search
CPC ............ G01J 3/0291; G01J 2003/2826; G03B 15/02; G06K 9/00496; H04N 1/6033; H04N 5/2254; H04N 1/6027; H04N 5/2256; G06T 2207/10152; G06T 7/00
See application file for complete search history.

(56) References Cited

U.S. PATENT DOCUMENTS

| | | | |
|---|---|---|---|
| 2009/0244355 A1* | 10/2009 | Horie | ................. G02B 5/28 |
| 2015/0192838 A1* | 7/2015 | Ishiyama | ............... G03B 15/06 |
| 2017/0236266 A1* | 8/2017 | Rostami et al. | ...... G06T 7/0004 |

FOREIGN PATENT DOCUMENTS

| | | |
|---|---|---|
| JP | 2015-131483 A | 7/2015 |
| JP | 2016-200446 A | 12/2016 |
| WO | 2014/003030 A1 | 1/2014 |
| WO | 2014/021449 A1 | 2/2014 |

* cited by examiner

OBJECT COLLATION DEVICE

This Application is a National Stage of International Application No. PCT/JP2017/005733 filed Feb. 16, 2017.

TECHNICAL FIELD

The present invention relates to an object collation device, an identifier generation device, an object management system, an object collation method, an identifier generation method, an object management method, a program, and an imaging adapter.

BACKGROUND ART

Attempts are made to utilize individual difference between fine uneven patterns of objects for authentication and collation.

For example, Patent Document 1 describes use of an uneven pattern provided by a satin pattern formed on a surface of an object for authentication and verification of the object. Here, a satin pattern is not only formed as a design. The case of forming a satin pattern on a verification area for the purpose of identification or verification of the object is also included. Additionally, the satin pattern is not limited to that applied by processing performed on metal or synthetic resin. A wrinkle pattern (embossments) and the like, obtained by applying surface treatment (for example, embossing) to leather products, are also included. Patent Document 1 describes an imaging aid, an imaging device, and an imaging method for capturing such a fine uneven pattern with good contrast.

Further, Patent Document 2, for example, describes a method of forming an uneven pattern on the inner surface of a mold by blasting or embossing through etching. Patent Document 2 also describes a method in which a recessed portion is colored by being filled with black ink, for example, and the ink adhering to a protruding portion at that time is removed by dummy casting, in order to image an uneven pattern with good contrast.

Patent Document 1: WO 2014/021449 A
Patent Document 2: JP 2016-200446 A

SUMMARY

However, in order to form a fine uneven pattern on a surface of an object by processing performed on metal, synthetic resin or the like, or by embossing through blasting or etching, a large-scale processing apparatus is required. Therefore, it is difficult to easily use individual difference between fine uneven patterns of objects for authentication and collation.

An exemplary object of the present invention is to provide devices and methods that solve the aforementioned problem.

An object collation device according to one aspect of the present invention includes an imaging unit that images an uneven pattern on a surface of an ink layer formed on a target object, and a recognizing unit that recognizes the target object based on an image of the uneven pattern obtained by imaging.

An identifier generation device according to another aspect of the present invention includes a generation unit that forms an ink layer on a target object, an imaging unit that images an uneven pattern on a surface of the ink layer, and a registration unit that registers an imaged result.

An object management system according to another aspect of the present invention includes an identifier generation device and an object collation device.

The identifier generation device includes a generation unit that forms an ink layer on a target object, an imaging unit that images an uneven pattern on a surface of the ink layer, and a registration unit that registers an imaged result in a storage unit.

The object collation device includes an imaging unit that images the uneven pattern on the surface of the ink layer formed on the target object, and a recognizing unit that recognizes the target object based on an image of the uneven pattern obtained by imaging.

An object collation method according to another aspect of the present invention includes imaging an uneven pattern on a surface of an ink layer formed on a target object, and recognizing the target object based on an image of the uneven pattern obtained by the imaging.

An identifier generation method according to another aspect of the present invention includes forming an ink layer on a target object, imaging an uneven pattern on a surface of the ink layer, and registering a result of the imaging in a storage unit.

An object management method according to another aspect of the present invention includes an identifier generation step and an object collation step.

The identifier generation step includes forming an ink layer on a target object, imaging an uneven pattern on a surface of the ink layer, and registering a result of the imaging in a storage unit.

The object collation step includes imaging the uneven pattern on the surface of the ink layer formed on the target object, and recognizing the target object based on an image of the uneven pattern obtained by the imaging.

A program according to another aspect of the present invention is a program for causing a computer to function as a recognizing unit that recognizes a target object based on an image of an uneven pattern acquired by imaging the uneven pattern on a surface of an ink layer formed on the target object.

An imaging adapter according to another aspect of the present invention is an imaging adapter mountable on a camera that images an uneven pattern on a surface of an ink layer formed on an object. The imaging adapter includes a light source that emits light to the surface of the ink layer from four oblique sides at a predetermined angle from a normal direction directly opposite to the ink layer, and a housing in which a direction other than a direction of the light source, as viewed from the ink layer, is a dark area. The housing receives light that is emitted from the light source and is specularly reflected at the surface of the ink layer, and has an opening for observing the uneven pattern as a contrast image.

As the present invention has the configuration described above, the present invention is able to realize devices and methods that are simple and able to use individual difference between fine uneven patterns for authentication and collation.

EXEMPLARY EMBODIMENTS

A surface of an ink layer formed on an object is not completely flat but has fine irregularities. In particular, on a surface of an ink layer formed of a fast-drying ink, or a surface of an ink layer that is formed of a non-fast-drying ink but strongly heated in the initial stage of the drying process, crater-like irregularities are caused by a phenomenon called cratering. Cratering is a phenomenon that a dry film is formed only on a top layer of an ink film, the solvent content is confined in the lower layer, and the solvent content breaks through the surface film so that a crater-like pattern (cratering pattern) is formed. According to the observation by the inventor, the diameter of a crater (size in the ink layer plane direction) is 10 μm or larger but 100 μm or smaller. The present invention is mainly characterized in using a fine cratering pattern, formed on a surface of an ink layer as described above, for individual identification. Hereinafter, the present invention will be described by way of several exemplary embodiments. The ink in the present description includes not only ink in the narrow sense but also paint.

First Exemplary Embodiment

Figure 1:
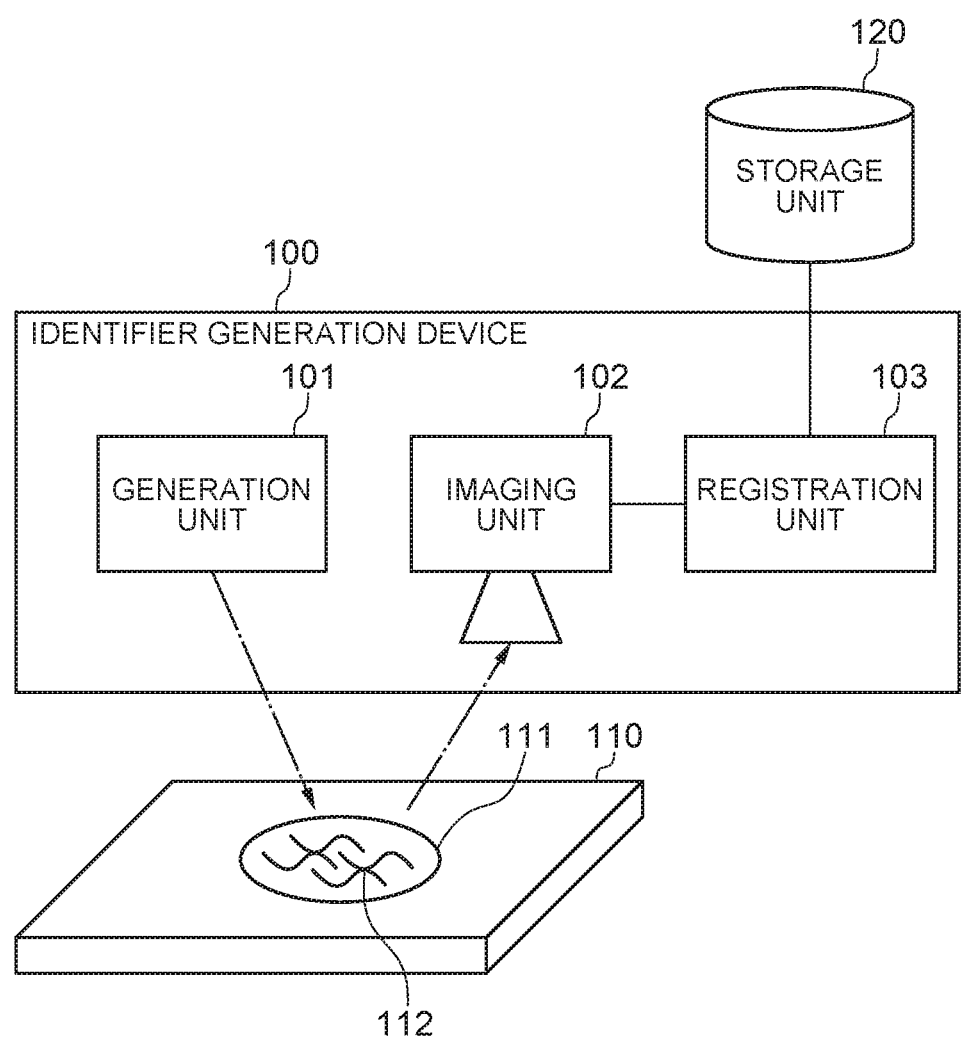
FIG. 1 is a diagram illustrating an exemplary configuration of an identifier generation device according to a first exemplary embodiment of the present invention.

Referring to FIG. 1, an identifier generation device 100 according to a first exemplary embodiment of the present invention is a device that generates an ink layer 111 on an object 110. The identifier generation device 100 is also a device that images an uneven pattern 112 on a surface of the ink layer 111 to acquire an image of the uneven pattern 112. The identifier generation device 100 is also a device that generates an individual identifier to be used for individual identification of the object 110, from the acquired image of the uneven pattern 112. The identifier generation device 100 is also a device that registers a generated individual identifier in a storage unit 120.

The object 110 is a target on which the uneven pattern 112 for individual identification is generated. The object 110 is an industrial product or a product package, for example. The object 110 may be any of personal belongings (such as a business card and a notebook) or part of an individual body (for example, a finger or the like).

The identifier generation device 100 includes a generation unit, 101, an imaging unit 102, and a registration unit 103, as main functional units.

The generation unit 101 has a function of generating the ink layer 111 on the object 110. The generation unit 101 generates the ink layer 111 by applying one drop or some drops of ink onto the object 110, for example. The generation unit 101 may include an ink supply unit such as an ink pen or an ink jet that is commercially available, for example. Ink used to form the ink layer 111 is preferably a fast-drying ink. For example, as an ink pen, "quick-dry marker Dry Ace", manufactured and sold by Teranishi Chemical Industry Co., Ltd., can be used. However, it is needless to say that the ink pen is not limited thereto. An ink pen that is designed exclusively designed for the present invention may be used.

When the object 110 has an absorbing surface that absorbs ink and a non-absorbing surface that does not absorb ink, the generation unit 101 selects a non-absorbing surface of the surfaces of the object 110, and forms the ink layer 111 on the non-absorbing surface 111. Thereby, it is possible to reliably generate a large number of irregularities by the cratering phenomenon on the surface of the ink layer.

When forming the ink layer 111 on the object 110, it is preferable that the generation unit 101 applies or drops ink a plurality of times within a limited short period at the same location or a vicinity location on the object 110. In other words, the generation unit 101 causes the nib of the ink pen to repeatedly hit the surface of the object 110. Thereby, as the thickness of the ink layer applied on the object 110 increases, it is possible to reliably generate a large number of irregularities by the cratering phenomenon on the surface of the ink layer. Thereby, even in the case where the ink layer 111 is formed on a non-absorbing surface on the object 110, it is possible to facilitate generation of irregularities by the cratering phenomenon on the surface of the ink layer.

Figure 2:
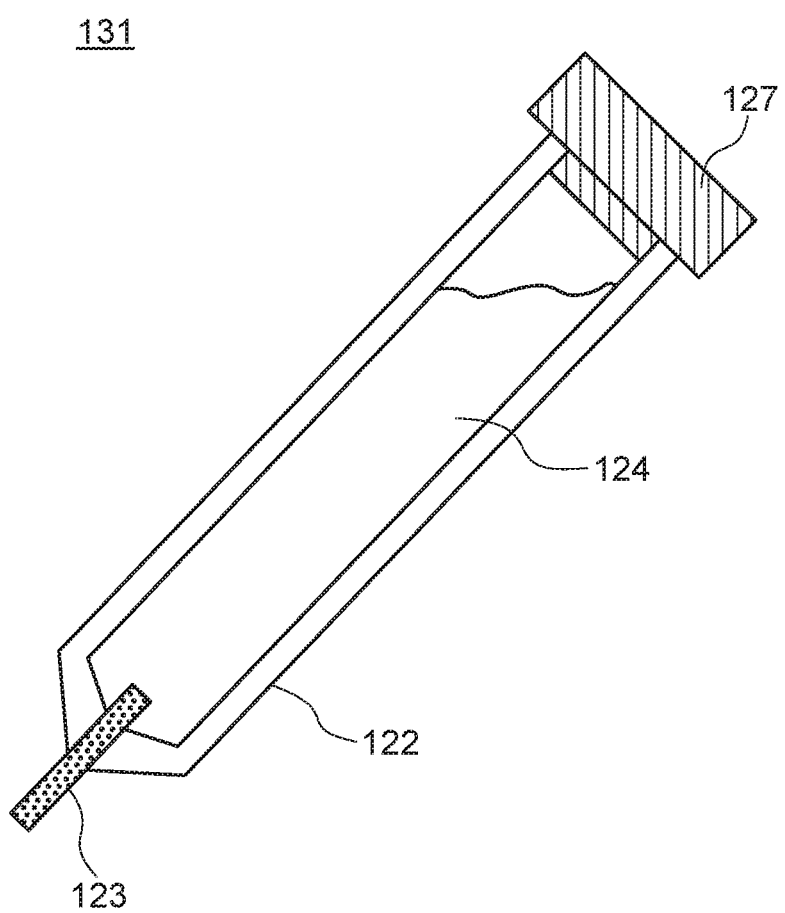
FIG. 2 is a diagram illustrating an example of an ink supplying unit usable as a generation unit of the identifier generation device according to the first exemplary embodiment of the present invention.

FIG. 2 illustrates an example of an ink supply unit usable as the generation unit 101. An ink supply unit 131 of this example is configured such that a nib portion 123 made of a felt material is mounted in a through hole provided at the tip end portion of a pen-shaped housing 122. Further, the housing 122 is filled with the ink 124. It is preferable that the ink 124 is of a fast drying type. The color of the ink 124 may be any arbitrary color such as black or red. The ink 124 packed in the housing 122 soaks into the nib portion 123 by capillary action. When the tip of the nib portion 123 abuts the object, the ink seeping from the nib portion 123 is applied onto the object. A cap 127 attached to the rear end of the housing 122 is detachable so as to enable refilling of the ink 124.

Figure 3:
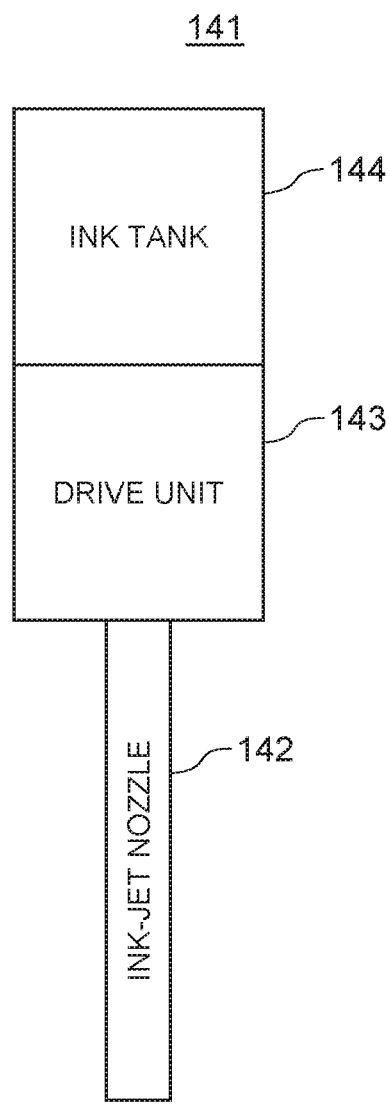
FIG. 3 is a diagram illustrating another example of an ink supplying unit usable as a generation unit of the identifier generation device according to the first exemplary embodiment of the present invention.

FIG. 3 illustrates another example of an ink supply unit usable as the generation unit 101. An ink supply unit 141 of this example includes an ink jet nozzle 142, a drive unit 143, and an ink tank 144. The ink tank 144 is preferably filled with a fast-drying ink. When the drive unit 143 receives an output command over a signal line not illustrated, the drive unit 143 allows an ink supplied from the ink tank 144 to be jetted from the tip end of the ink jet nozzle 142 for a certain time at a predetermined pressure. The ink jetted to the outside adheres to the surface of the object and forms an ink layer.

Figure 4:
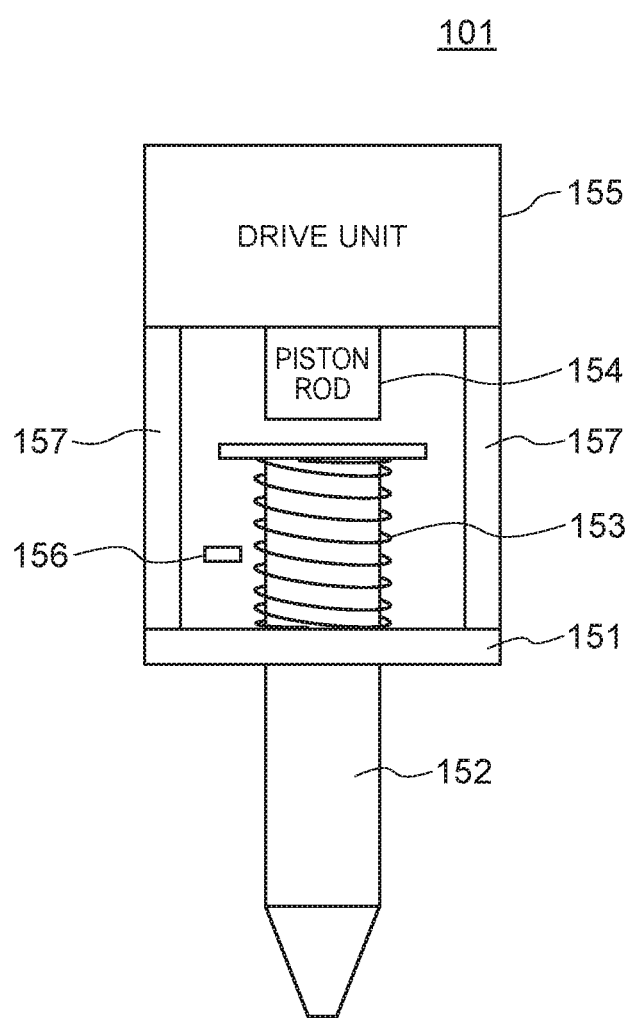
FIG. 4 is a diagram illustrating an exemplary configuration of an identifier generation device according to the first exemplary embodiment of the present invention.
Figure 5:
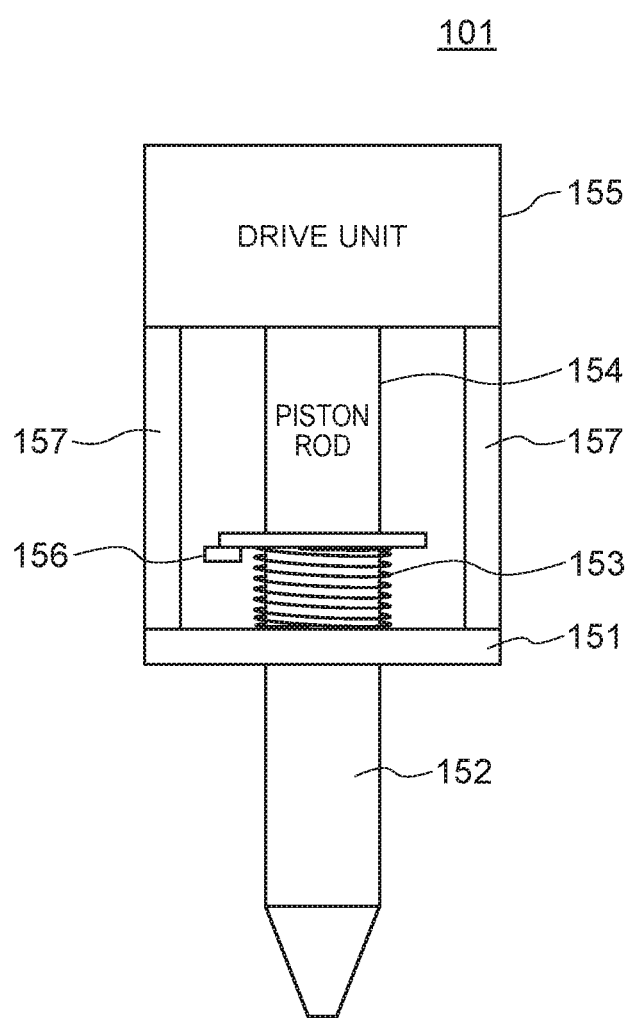
FIG. 5 is a diagram illustrating a state where an ink supplying unit of the generation unit of the identifier generation device is lowered to an ink layer generation position in the first exemplary embodiment of the present invention.

FIG. 4 is a block diagram illustrating an example of the generation unit 101. In the generation unit 101 of this example, an ink supply unit 152 is detachably mounted in a through hole provided in a plate 151. The ink supply unit 152 is an ink pen, for example. The ink supply unit 152 has a return spring 153 that constantly applies upward elastic force to the ink supply unit 152. Above the ink supply unit 152, there is a drive unit 155 that moves a piston rod 154 of a cylinder in an up and down direction when receiving a predetermined command from the outside. The housing of the drive unit 155 and the plate 151 are connected by a connecting member 157. As illustrated in FIG. 5, when the piston rod 154 is stroked downward by the drive unit 155 to press the ink supply unit 152, the ink supply unit 152 is lowered from the standby position to the ink supply position against the elastic force of the return spring 153. Thereby, when the ink supply unit 152 is an ink pen, the nib abuts against the surface of the object 110 and only one drop of ink is supplied to the surface of the object 110. In the case where the ink supply unit 152 is of the ink jet type, the tip end portion of the ink jet nozzle is positioned at a height appropriate for jetting out the ink. When the ink is jetted from the position, the ink is supplied to the surface of the object 110. On the other hand, when the piston rod 154 is raised by the drive unit 155, the ink supply unit 152 is raised to the standby position by the elastic force of the return spring 153.

In the generation unit 101 illustrated in FIGS. 4 and 5, the ink supply unit 152 is moved from the standby position to the ink supply position, and is also moved from the ink supply position to the standby position. In order to do so, a cylinder stroke mechanism with the piston rod 154 of the cylinder is used. However, the mechanism of vertically moving the ink supply unit 152 is not limited to the cylinder stroke mechanism. It is possible to use another mechanism such as a linear motion mechanism using a linear guide and a ball screw, for example.

Referring to FIG. 1 again, the imaging unit 102 has a function of imaging the uneven pattern 112 of the surface of the ink layer 111 in conjunction with generation of the ink layer 111 by the generation unit 101. The imaging unit 102 also has a function of acquiring an image of the uneven pattern 112 after the uneven pattern 112 becomes stable. Furthermore, the imaging unit 102 has a function of extracting, from the acquired image of the uneven pattern 112, the feature quantity that depends on the uneven pattern 112 as an individual identifier of the object 110.

Figure 6:
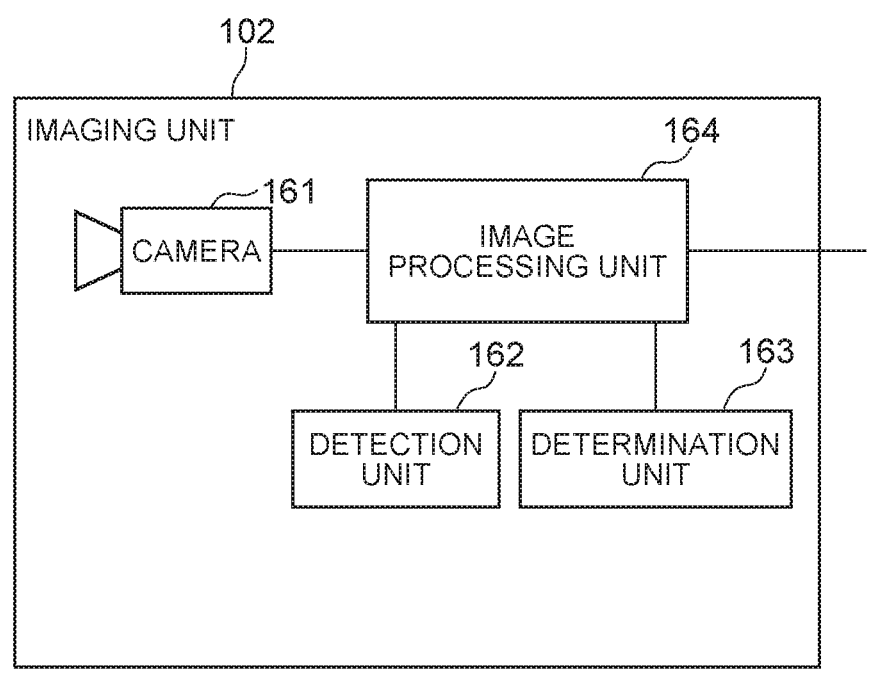
FIG. 6 is a diagram illustrating an exemplary configuration of an imaging unit of the identifier generation device according to the first exemplary embodiment of the present invention.
Figure 7:
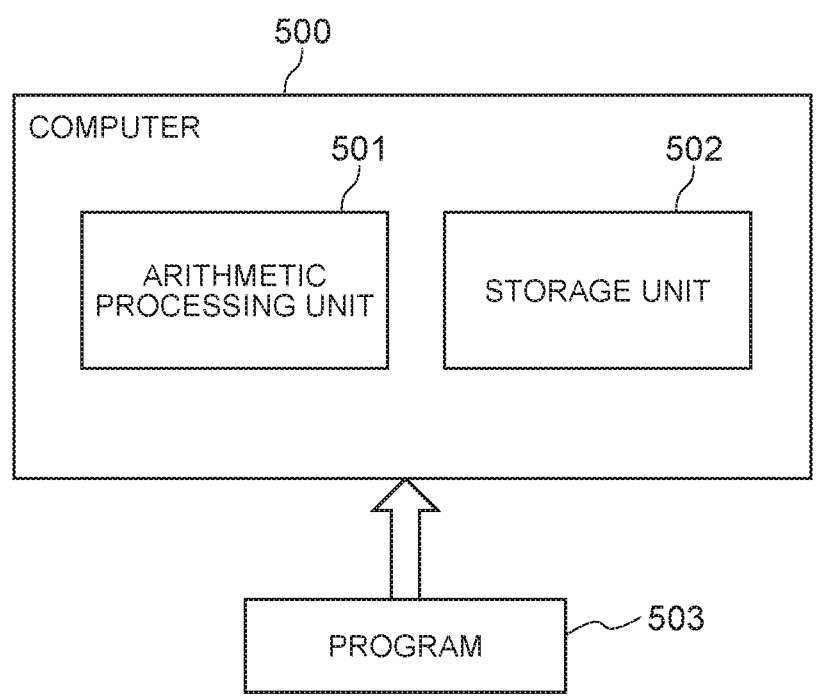
FIG. 7 is a diagram illustrating an example of a computer for implementing the present invention.

FIG. 6 is a block diagram illustrating an example of the imaging unit 102. The imaging unit 102 of this example includes a camera 161, a detection unit 162, a determination unit 163, and an image processing unit 164. The detection unit 162, the determination unit 163, and the image processing unit 164 can be implemented by a computer 500 including an arithmetic processing unit 501 and a storage unit 502 and a program 503 as illustrated in FIG. 7, besides a dedicated hardware. The program 503 is read by the computer 500 when the computer 500 is started or the like, and controls the operation of the computer 500 to thereby implement the detection unit 162, the determination unit 163, and the image processing unit 164 on the computer 500.

The camera 161 may be configured of a charge coupled devices (CCD) image sensor or a complementary metal oxide (CMOS) image sensor, for example.

The detection unit 162 has a function of detecting whether or not generation of the ink layer 111 is performed by the generation unit 101. The determination unit 163 has a function of determining whether or not the uneven pattern 112 on the ink layer 111 is stabilized. The image processing unit 164 has a function of acquiring an image of the uneven pattern 112 after it is determined that the uneven pattern 112 is stabilized. The image processing unit 164 also has a function of extracting a feature amount for individual identification from the acquired image and outputting it to the registration unit 103. Hereinafter, exemplary configurations of the detection unit 162, the determination unit 163, and the image acquisition unit 164 will be described in detail.

First, an exemplary configuration of the detection unit 162 will be described.

The detection unit 162 may be configured to detect motion of the generation unit 101 when it generates the ink layer 111 to thereby detect whether or not generation of the ink layer 111 is performed. For example, in the case where the generation unit 101 perform a predetermined motion when generating the ink layer 111, the detection unit 162 may be configured to detect the predetermined motion of the generation unit 101. For example, when the generation unit 101 has the configuration illustrated in FIGS. 4 and 5, it is possible to have a configuration of detecting, by a limit switch 156, that the ink supply unit 152 is lowered to the ink supply position.

The detection unit 162 may also be configured to detect whether or not generation of the ink layer 111 is performed by the generation unit 101, by exchanging a signal with the generation unit 101. For example, when the generation unit 101 has the configuration illustrated in FIGS. 4 and 5, a command given from the outside to the drive unit 155 is also given to the detection unit 162 simultaneously. The detection unit 162 detects that the ink layer 111 is generated by the generation unit 101 when it receives a command.

The detection unit 162 may also be configured to detect whether or not the ink layer 111 is generated, by detecting a visual change in a predetermined region on the object 110 through image recognition. For example, the detection unit 162 acquires an image of a predetermined region on the object 110 at certain time intervals by the camera 161 via the image processing unit 164. As the predetermined region, a region including a portion where the ink layer 111 is planned to be generated is desirable. Next, the detection unit 162 calculates a difference between a predetermined feature amount extracted from one acquired image and a predetermined feature amount extracted from one image acquired immediately before it, and compares an absolute value of the calculated difference with a threshold. Here, as a feature amount, an average value of luminance values of an image may be used. However, it is not limited thereto. Next, when the absolute value of the difference is larger than the threshold, the detection unit 162 determines that the generation unit 101 has generated the ink layer. Otherwise, the detection unit 162 determines that the generation unit 101 has not generated a pattern. In general, a region where the ink layer 111 is planned to be generated is significantly changed visually, before and after the generation of ink layer 111. Therefore, by detecting such a visual change, it is possible to detect whether or not the generation unit 101 has generated the ink layer 111.

Next, an exemplary configuration of the determination unit 163 will be described.

Figure 8:
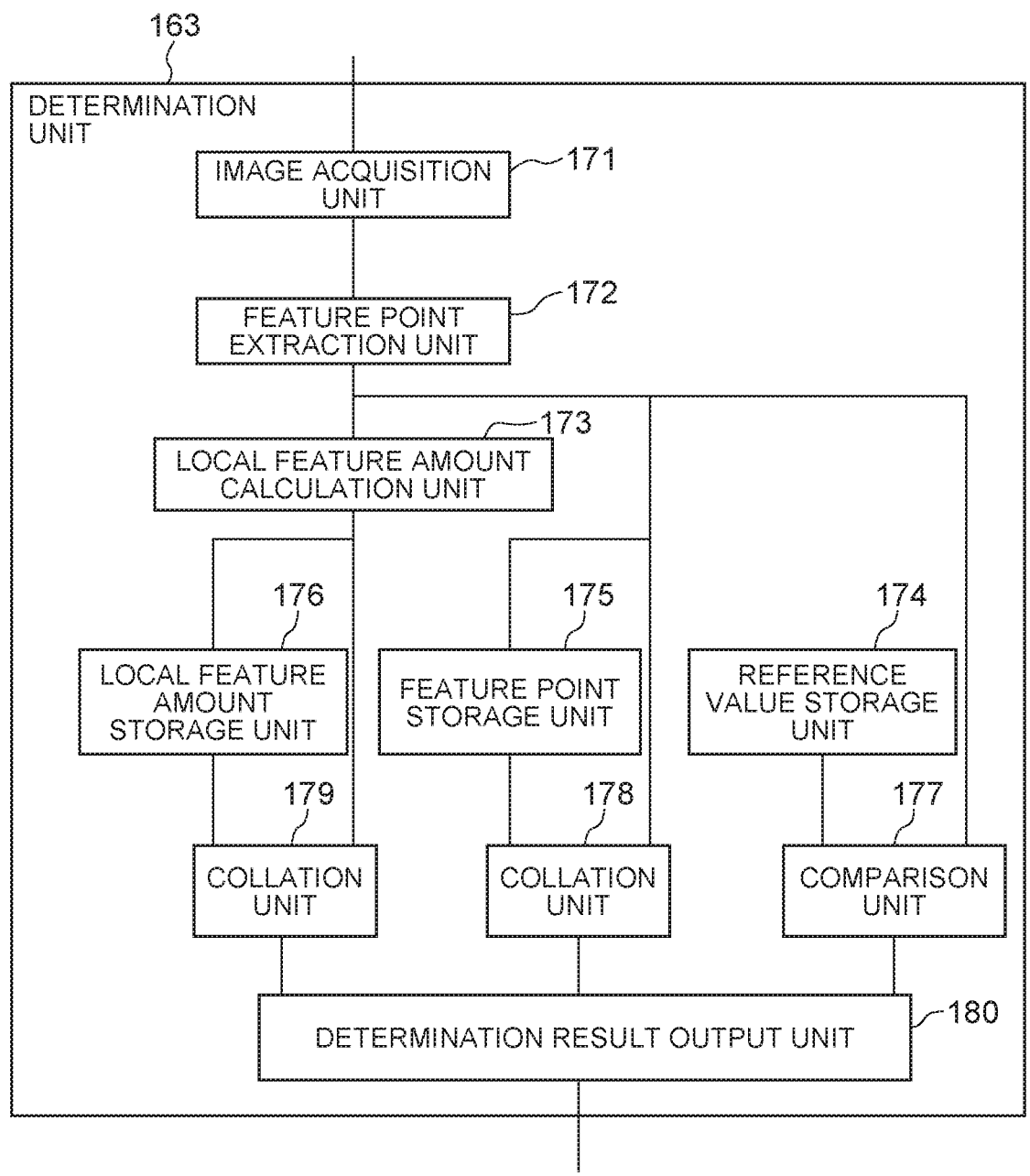
FIG. 8 is a diagram illustrating an exemplary configuration of a determination unit provided to the imaging unit of the identifier generation device according to the first exemplary embodiment of the present invention.

FIG. 8 is a block diagram illustrating an example of the determination unit 163. The determination unit 163 of this example determines, through image processing, whether or not the uneven pattern 112 is stabilized, based on time-series images obtained by imaging the uneven pattern 112 on the surface of the ink layer 111 generated on the object 110 in a time-series manner. The determination unit 163 includes an image acquisition unit 171, a feature point extraction unit 172, a local feature amount calculation unit 173, a reference value storage unit 174, a feature point storage unit 175, a local feature amount storage unit 176, a comparison unit 177, collation units 178 and 179, and a determination result output unit 180.

The image acquisition unit 171 acquires time-series images of the uneven pattern 112 generated on the object 110, directly from the camera 161 or indirectly via the image processing unit 164. To the acquired image, an image identifier i such as an image number is given.

The feature point extraction unit 172 extracts characteristic points (feature points) existing at edges or corners from an image, by the action of a differential filter (sobel or the like) on the two-dimensional luminance distribution of the image acquired by the image acquisition unit 171. The local feature amount calculation unit 173 calculates, from an extracted feature point and a pixel value of a pixel in the vicinity thereof, the feature amount relating to the feature point (local feature amount). As the local feature amount, a method of assigning an orientation (direction) for each feature point based on the gradient or the gradient direction of the distribution of pixel values in a two-dimensional array, such as Scale Invariant Feature Transform (SIFT) or Binary Robust Independent Elementary Features (BRIEF) can be used, for example. However, it is not limited thereto.

The reference value storage unit 174 stores a reference value to be compared with the number of feature points extracted from each image of the time-series images. The reference value is determined based on the number of feature points necessary for achieving predetermined collation accuracy. The feature point storage unit 175 stores information of feature points (such as the number of the feature points and positions in the image) extracted from each image of the time-series images, in association with the image identifier i. The local feature amount storage unit 176 stores a local feature amount calculated from each feature point of each image of the time-series images, in association with the image identifier i.

Each time a feature point is extracted from an image having the image identifier i by the feature point extraction unit 172, the comparison unit 177 compares the number of feature points extracted from the image with the reference value stored in the reference value storage unit 174. When the number of extracted feature points exceeds the reference value, the comparison unit 177 outputs a set of the image identifier i and a value 1. Otherwise, the comparison unit 177 outputs a set of the image identifier i and a value 0.

Each time a feature point is extracted from an image having the image identifier i by the feature point extraction unit 172, the collation unit 178 collates the information of the extracted feature points with the information of the feature points extracted from an immediately preceding image in time (image identifier i-1) stored in the feature point storage unit 175, and calculates a score indicating the degree of similarity between the two. For example, the collation unit 178 calculates the score by using the number of feature points corresponding to each other between both images. Alternatively, the collation unit 178 calculates the score by normalizing the number of feature points corresponding to each other between both images with the number of feature points in the collation target image. However, the method of calculating the score is not limited thereto. The collation unit 178 compares the calculated score with a threshold, and when the score has higher similarity than the threshold, the collation unit 178 outputs a set of the image identifier i and a value 1. Otherwise, the collation unit 178 outputs a set of the image identifier i and a value 0.

Each time a local feature amount is extracted from an image having the image identifier i by the local feature amount calculation unit 173, the collation unit 179 collates the extracted local feature amount with the local feature amount extracted from an immediately preceding image in time (image identifier i-1) stored in the local feature amount storage unit 176, and calculates a score indicating the degree of similarity between the two. For example, the collation unit 179 calculates the score by using the number of local feature amounts corresponding to each other between both images. Alternatively, the collation unit 179 calculates the score by normalizing the number of local feature amounts corresponding to each other between both images with the number of local feature amounts in the collation target image. Alternatively, the collation unit 179 calculates the score from the Hamming distance between codes representing the local feature amounts of the two. However, the method of calculating the score is not limited thereto. The collation unit 179 compares the calculated score with a threshold, and when the score has higher similarity than the threshold, the collation unit 179 outputs a set of the image identifier i and a value 1. Otherwise, the collation unit 179 outputs a set of the image identifier i and a value 0.

Figure 9:
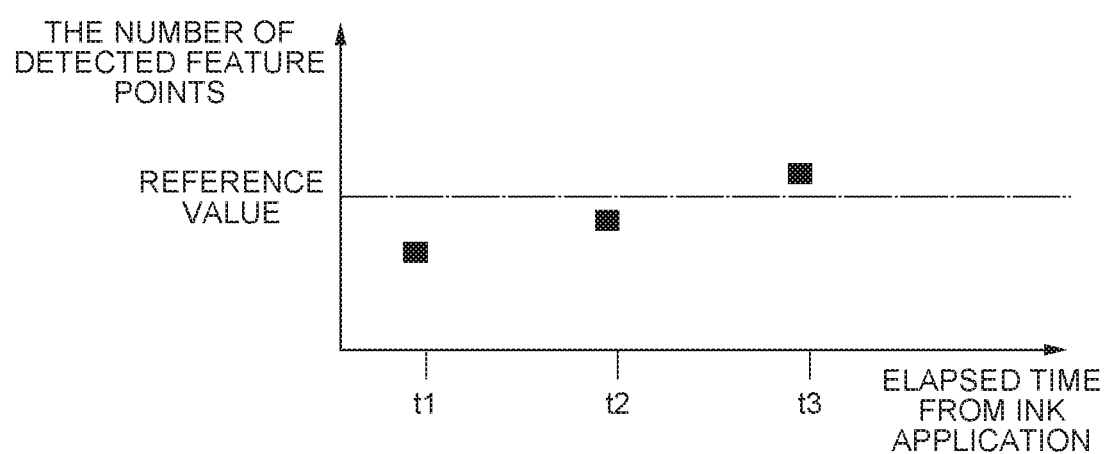
FIG. 9 is an exemplary graph for explaining an operation of a comparison unit included in the determination unit provided to the imaging unit of the identifier generation device according to the first exemplary embodiment of the present invention.

FIG. 9 is a graph for explaining the operation of the comparison unit 177 in the determination unit 163. The horizontal axis represents the elapsed time after the ink is supplied, the vertical axis represents the number of detected feature points, and a black circle represents the number of feature points acquired from each of the images constituting the time-series images. Further, one-dot chain line represents a reference value stored in the reference value storage unit 174. As illustrated in FIG. 9, in general, the number of feature points extracted from an image increases as the time passes after the ink is supplied. This is because a change is made to increase the number of feature points by the cratering phenomenon until the ink dries. Accordingly, a certain reference value is set, and when the number of extracted feature points exceeds the reference value, it is determined that the pattern is stabilized. In the example of FIG. 9, although the number of feature points extracted from either of two images captured at time t1 and time t2 is below the reference value, the number of feature points extracted from an image captured at time t3 exceeds the reference value. Therefore, for the images captured at time t1 and time t2, the comparison unit 177 outputs a set of the image identifier thereof and a value 0, while outputs a set of the image identifier thereof and a value 1 for the image captured at time t3.

Figure 10:
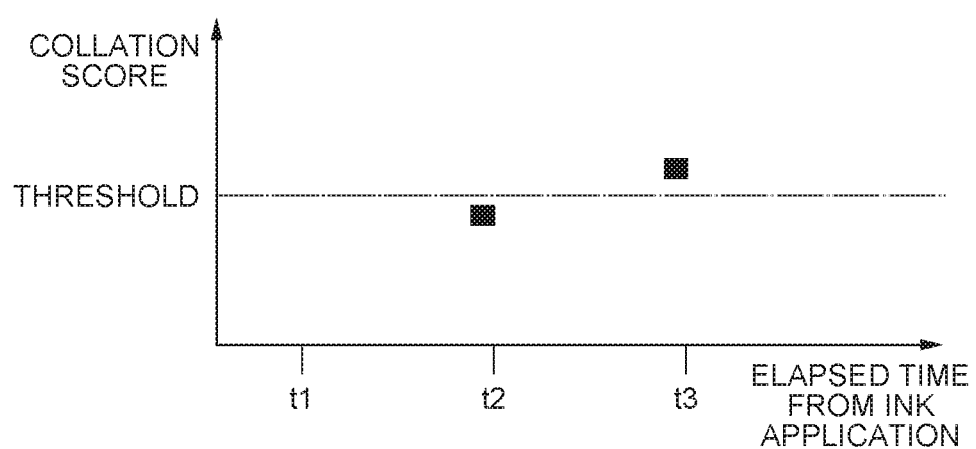
FIG. 10 is an exemplary graph for explaining an operation of a collation unit included in the determination unit provided to the imaging unit of the identifier generation device according to the first exemplary embodiment of the present invention.

FIG. 10 is a graph for explaining the operation of the collation units 178 and 179 in the determination unit 163. The horizontal axis represents an elapsed time after the ink is supplied, the vertical axis represents the collation score, and a black circle represents a collation score between each image constituting the time-series images and an immediately preceding image thereof. Further, a one-dot chain line represents a threshold. The example illustrated in FIG. 10 shows a case where as the collation score is greater, information of feature points and local feature amounts of two images are more similar. As illustrated in FIG. 10, in general, the collation score between an image and an immediately preceding image increases as the time passes after the ink is supplied. The reason is that in the initial stage of the ink drying process, cratering phenomenon occurs vigorously so that a temporal change in the uneven pattern is intense, but when the ink almost dries and occurrence of cratering phenomenon is reduced gradually, such a change does not occur. Therefore, a certain threshold is set, and when the score between an image and an immediately preceding image exceeds the threshold, it is determined that the pattern is stabilized. In the example of FIG. 10, although the collation score between the two images captured at time t1 and time t2 is below the threshold, the collation score between the image captured at time t3 and the image captured at time t2 exceeds the threshold. Therefore, for the image captured at time t2, the collation units 178 and 179 output a set of the image identifier thereof and a value 0, and for the image captured at time t3, output a set of the image identifier thereof and a value 1. Further, for the image of time t1 that is captured first after the ink is supplied, the collation units 178 and 179 output a value 0 unconditionally.

Figure 11:
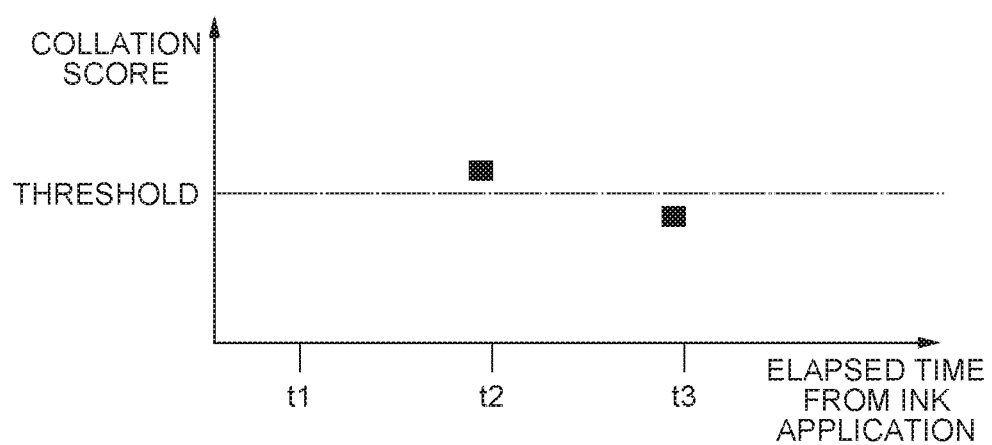
FIG. 11 is an exemplary graph for explaining an operation of a collation unit included in the determination unit provided to the imaging unit of the identifier generation device according to the first exemplary embodiment of the present invention.

FIG. 11 is a graph for explaining the operation of the collation units 178 and 179 in the determination unit 163. The horizontal axis represents the elapsed time after the ink is supplied, the vertical axis represents the collation score, and a black circle represents a collation score between each image constituting the time-series images and an immediately preceding image. Further, a one-dot chain line represents a threshold. The example illustrated in FIG. 11 shows a case where as the collation score is smaller, information of feature points and local feature amounts of the two images are more similar. In the example of FIG. 11, although the collation score between the two images captured at time t1 and time t2 exceeds the threshold, the collation score between the image captured at time t3 and the image captured at time t2 is below the threshold. Therefore, for the image captured at time t2, the collation units 178 and 179 output a set of the image identifier thereof and a value 0, and for the image captured at time t3, output a set of the image identifier thereof and a value 1. Further, for the image of time t1 that is captured first after the ink is supplied, the collation units 178 and 179 output a value 0 unconditionally.

Figure 12:
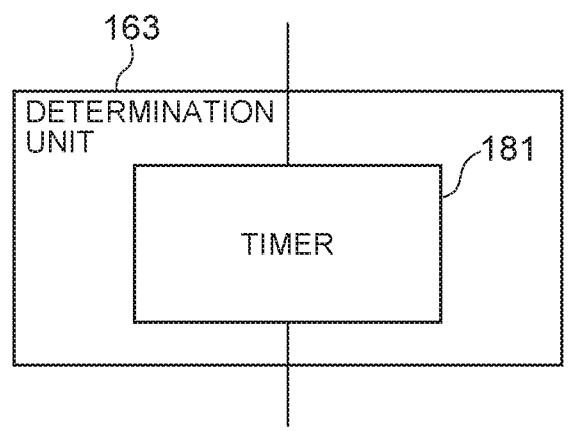
FIG. 12 is a diagram illustrating another exemplary configuration of a determination unit provided to the imaging unit of the identifier generation device according to the first exemplary embodiment of the present invention.

FIG. 12 is a block diagram illustrating another example of the determination unit 163. The determination unit 163 of this embodiment includes a timer 181.

The timer 181 is activated when generation of the ink layer 111 is detected by the detection unit 162, and after a subsequent predetermined period has passed, the timer 181 outputs a signal indicating that the uneven pattern 112 is stabilized. The predetermined period is determined based on the result of actually measuring the time from generation of the ink layer 111 by supplying ink to the object 110 until the uneven pattern 112 is stabilized.

Next, the image processing unit 164 will be described.

Figure 13:
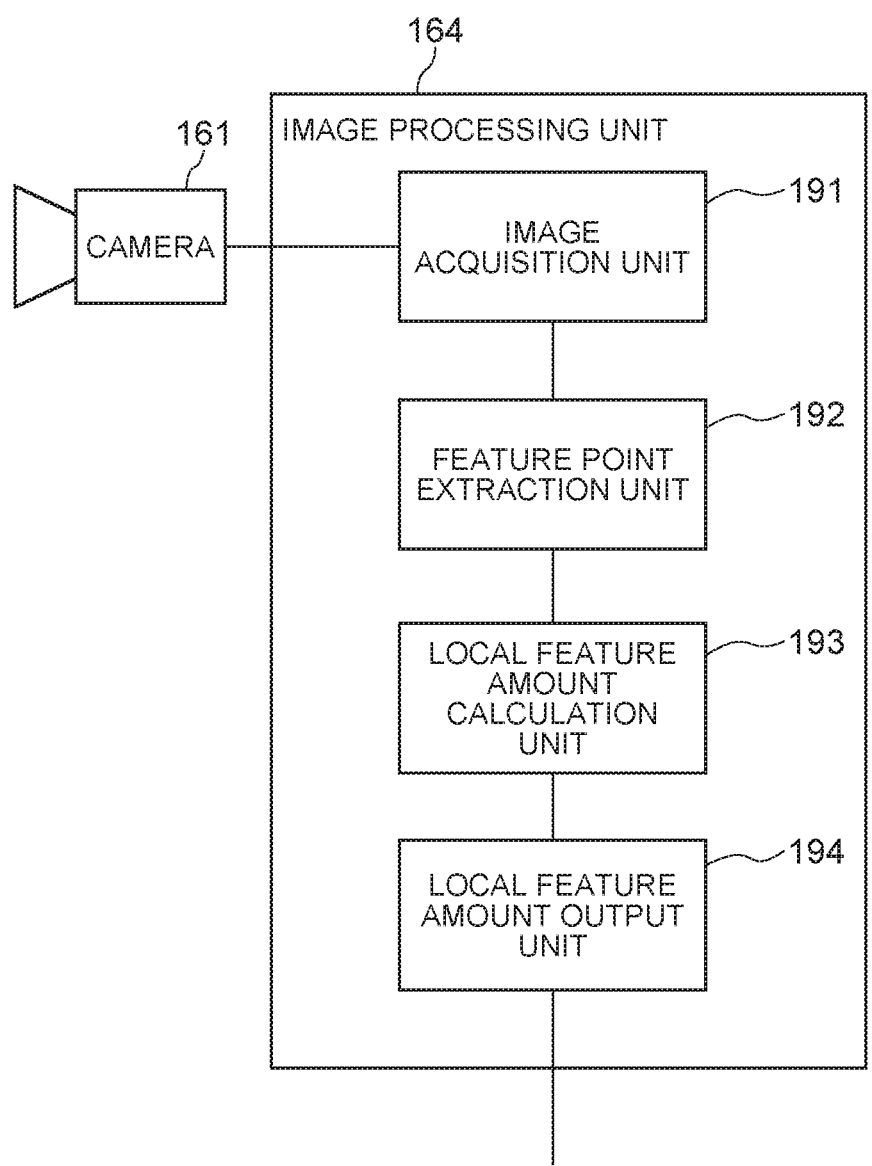
FIG. 13 is a diagram illustrating an exemplary configuration of an image processing unit provided to the imaging unit of the identifier generation device according to the first exemplary embodiment of the present invention.

FIG. 13 is a block diagram illustrating an example of the image processing unit 164. The image processing unit 164 of this example includes an image acquisition unit 191, a feature point extraction unit 192, a local feature amount calculation unit 193, and a local feature amount output unit 194.

The image acquisition unit 191 has a function of acquiring an image of the uneven pattern 112 on the ink layer 111 formed on the object 110, with use of the camera 161. The image acquisition unit 191 acquires one image by transmitting a command to release the shutter to the camera1 161 and reading, from the camera 161, an image captured by the camera 161 according to the command, for example. The image acquisition unit 191 transmits the acquired image to the processing unit in the subsequent stage, or outputs it to the detection unit 162 and the determination unit 163.

The feature point extraction unit 192 and the local feature amount calculation unit 193 have functions similar to those of the feature point extraction unit 172 and the local feature amount calculation unit 173 illustrated in FIG. 8. That is, the feature point extraction unit 192 extracts characteristic points (feature points) existing at edges or corners from an image acquired by the image acquisition unit 191. The local feature amount calculation unit 193 calculates, from an extracted feature point and a pixel value of a pixel in the vicinity thereof, the feature amount relating to the feature point (local feature amount).

The local feature amount output unit 194 outputs the local feature amount, calculated by the local feature amount calculation unit 193, to the registration unit 103 as an individual identifier of the object 110.

Referring again to FIG. 1, the registration unit 103 has a function of registering the individual identifier of the object 110, input from the imaging unit 102, in the storage unit 120. The registration unit 103 preferably registers the individual identifier of the object 110 in the storage unit 120 in association with attribute information of the object 110 (such as name and number of the object 110). The storage unit 120 may be a local memory of the computer constituting the identifier generation device 100, or may be a remote memory connected via a network such as the Internet.

Figure 14:
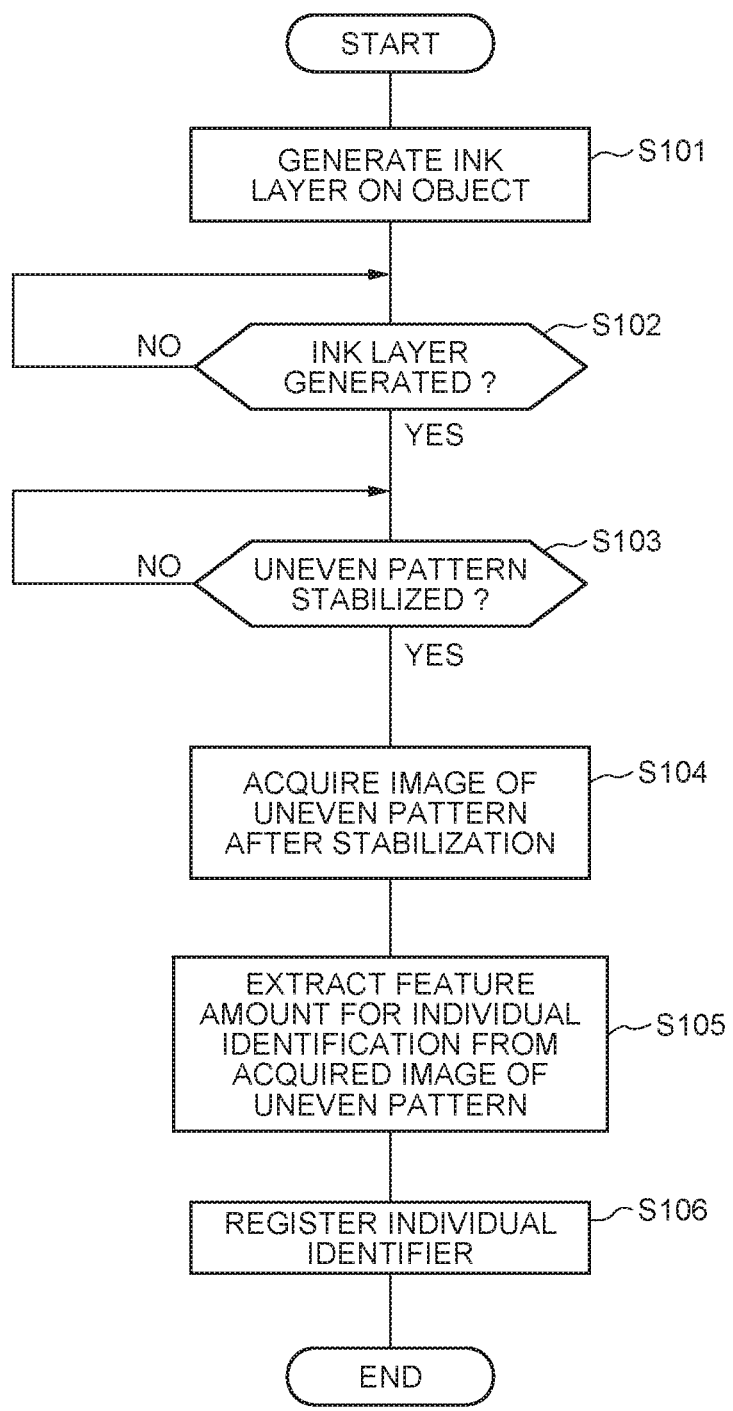
FIG. 14 is a flowchart illustrating a procedure of an identifier generation method performed with use of the identifier generation device according to the first exemplary embodiment of the present invention.

FIG. 14 is a flowchart illustrating a procedure of an identifier generation method performed with use of the identifier generation device 100. Hereinafter, the identifier generation method according to the present embodiment will be described with reference to FIG. 14.

First, the generation unit 101 of the identifier generation device 100 generates the ink layer 111 by applying ink onto the object 110 (step S101). For example, in the case of the generation unit 101 illustrated in FIG. 4, the piston rod 154 is stroked downward by the drive unit 155 to lower the ink supply unit 152 from the standby position to the ink supply position. Thereby, when the ink supply unit 152 is an ink pen, the nib abuts against the surface of the object 110 and only one drop of ink is supplied to the surface of the object 110. In the case where the ink supply unit 152 is of the ink jet type, the tip portion of the ink jet nozzle is positioned at a height appropriate for jetting out the ink. When the ink is jetted from the position, the ink is supplied to the surface of the object 110. Then, the piston rod 154 is raised by the drive unit 155, whereby the ink supply unit 152 is raised to the standby position.

Next, the imaging unit 102 of the identifier generation device 100 detects whether or not generation of an ink layer is performed by the generation unit 101 (step S102). Specifically, the imaging unit 102 uses the detection unit 162 to detect a predetermined motion of the generation unit 101 to thereby detect whether or not generation of an ink layer is performed. Alternatively, the imaging unit 102 uses the detection unit 162 to detect a visual change in the ink layer generation planned area on the object 110 through image recognition, to thereby detect whether or not generation of an ink layer is performed. Alternatively, the imaging unit 102 uses the detection unit 162 to exchange, with the generation unit 101, a command for the drive unit 155 to thereby detect whether or not generation of an ink layer is performed.

Next, when the imaging unit 102 detects that an ink layer is generated by the generation unit 101, the imaging unit 102 determines whether or not the uneven pattern 112 on the surface of the generated ink layer is stabilized (step S103). Specifically, the imaging unit 102 uses the determination unit 163 to compare the number of feature points extracted from a plurality of images constituting the time-series images of the uneven pattern obtained by imaging the uneven pattern in a time-series manner after the generation of the ink layer with a reference value, and at a point of time when an image in which the number of feature points exceeds the reference value is obtained, the imaging unit 102 determines that the pattern is stabilized. Alternatively, the imaging unit 102 uses the determination unit 163 to compare information related to each of the feature points extracted from a plurality of images constituting the time-series images of the uneven pattern obtained by imaging the uneven pattern in a time-series manner after the generation of the ink layer with each other, and at a point of time when a temporally subsequent image from which information related to a plurality of feature points that is almost similar to the information related to the feature points extracted from a temporally preceding image is obtained, the imaging unit 102 determines that the uneven pattern is stabilized. Alternatively, the imaging unit 102 uses the determination unit 163 to determine that the uneven pattern is stabilized at a point of time when a predetermined time has passed since generation of the ink layer.

Next, when the imaging unit 102 detects that the uneven pattern 111 is stabilized, the imaging unit 102 acquires an image of the uneven pattern 111 after the pattern is stabilized (step S104). Specifically, after it is detected that the uneven pattern 111 is stabilized with use of the image processing unit 164, the imaging unit 102 acquires an image of the uneven pattern 111 by using the camera 161. Alternatively, in the case where the determination unit 163 has the configuration illustrated in FIG. 8, as the pattern after being stabilized has been acquired by the image acquisition unit 171, the imaging unit 102 omits the operation of acquiring it again.

Next, the imaging unit 102 extracts a local feature amount for individual identification from the acquired image of the uneven pattern (step S105). Specifically, the imaging unit 102 uses the image processing unit 164 to extract the local feature amount for individual identification from an image of the uneven pattern in a stable state. Alternatively, in the case where the determination unit 163 has the configuration illustrated in FIG. 8, as the local feature amount for individual identification has been extracted by the image acquisition unit 171 from the image of the pattern after being stabilized, the imaging unit 102 omits the operation of acquiring it again.

Next, the registration unit 103 registers the extracted individual identifier extracted by the imaging unit 102 in the storage unit 120 (step S106). Specifically, the registration unit 103 registers the local feature amount of the object 110 in the storage unit 120 in association with attribute information of the object 110 (such as name and number of the object 110). In the case where the determination unit 163 has the structure illustrated in FIG. 8, the registration unit 103 reads out the local feature amount extracted from an image of the pattern in a stable state from the local feature amount storage unit 176 of the image processing unit 164, and registers it in the storage unit 120 in association with the attribute information of the object 110.

As described above, according to the present embodiment, it is possible to realize an apparatus and a method that are simple and are able to use individual difference between fine uneven patterns for authentication and collation. This is because a fine uneven pattern on the surface of an ink layer is used for individual identification of the object. Thereby, individual identification of a target object can be performed by a very simple method, that is, a method of applying an ink to the target object.

In general, an image of an uneven pattern in an unstable state is not completely identical to but different from an image of the uneven pattern in the subsequent stable state. Therefore, if an image of an uneven pattern in an unstable state is used for individual identification of an object, accuracy of individual identification is degraded. However, according to the present embodiment, the imaging unit 102 acquires an image of an uneven pattern after the uneven pattern on the surface of the ink layer generated by the generation unit 101 is stabilized. Therefore, according to the present embodiment, it is possible to prevent an image of an uneven pattern in an unstable state from being acquired. Therefore, accuracy of individual identification can be enhanced.

Further, by allowing the generation unit 101 and the imaging unit 102 to be associated with each other, it is possible to make settings optimum such as an appropriate ratio, focusing, lighting, photographing distance, and exposure, with respect to the pattern during imaging. Therefore, timely adjustment is unnecessary, and imaging errors can be prevented.

Second Exemplary Embodiment

Figure 15:
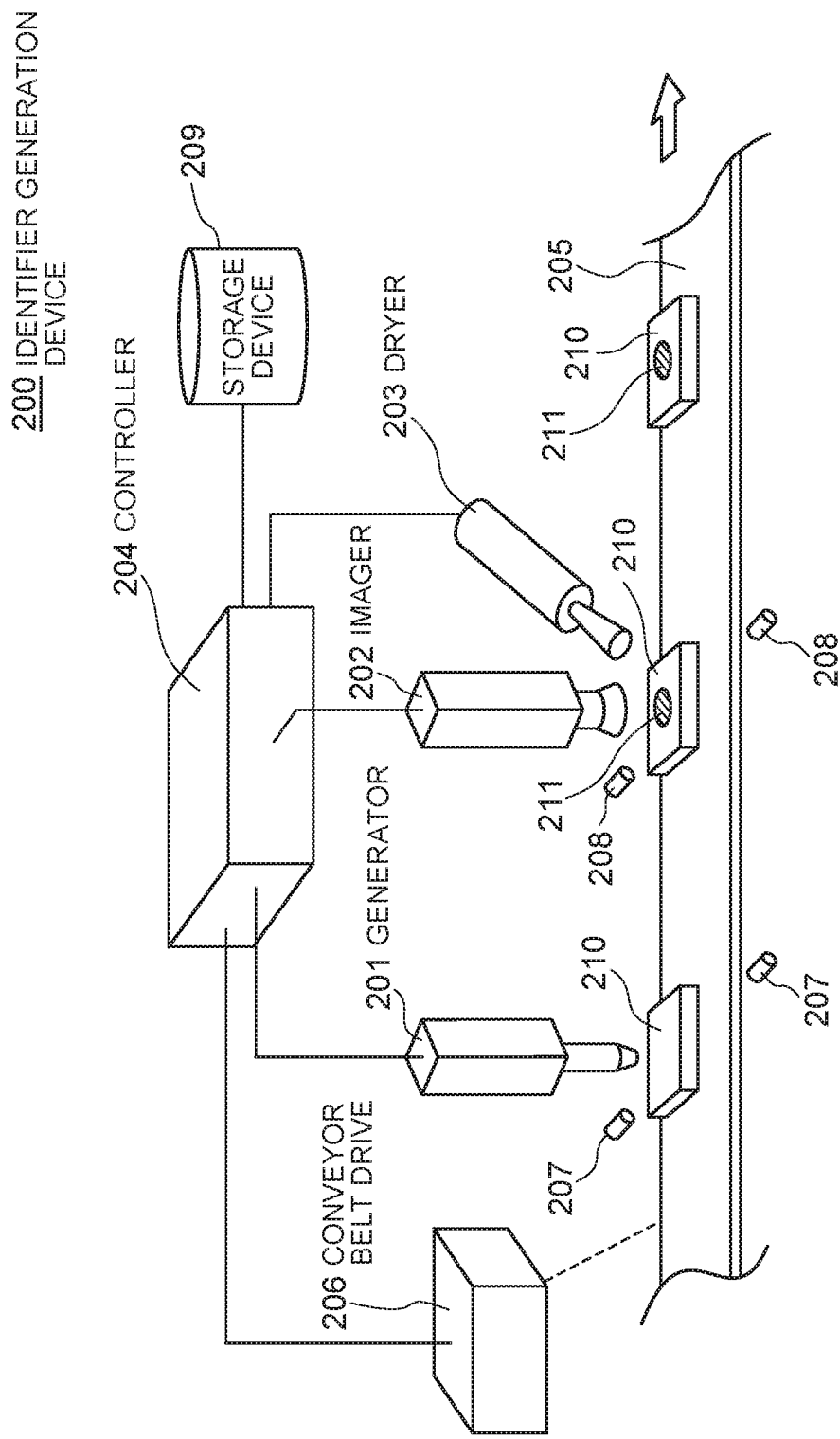
FIG. 15 is a diagram illustrating an exemplary configuration of an identifier generation device according to a second exemplary embodiment of the present invention.

Referring to FIG. 15, an identifier generation device 200 according to a second exemplary embodiment of the present invention performs generation of an ink layer 211 on an object 210 and acquisition of an image of an uneven pattern on the surface of an ink layer 211 for each feed pitch on the upper surface of a conveyor belt 205. The object 210 and the ink layer 211 are the same as the object 110 and the ink layer 111 illustrated in FIG. 1. The conveyor belt 205 is also referred to as a conveyance path.

The identifier generation device 200 includes a generator 201, an imager 202, a dryer 203, a controller 204, a conveyor belt drive 206, optical switches 207 and 208, and a storage device 209. The generator 201 and the imager 202 are disposed above the conveyor belt 205 with intervals in the longitudinal direction of the conveyor belt 205.

The conveyor belt drive 206 is configured of a stepping motor for pitch-feeding the conveyor belt 205, and the like. The optical switch 207 is a sensor that detects whether or not the object 211 is present on the conveyor belt 205 immediately below the generator 201. The optical switch 208 is a sensor that detects whether or not the object 211 is present on the conveyor belt 205 immediately below the imager 202.

The generator 201 is a unit that generates an ink layer 211 on the object 210 on the conveyor belt 205 which is positioned immediately below the generator 201. The generator 201 may be implemented by the generation unit 101 as illustrated in FIG. 4, for example.

The dryer 203 is a unit that rapidly promotes drying of the ink layer 211. The dryer 203 is mounted so as to be able to blow high-temperature hot air to the ink layer 211 of the object 210 on the conveyor belt 205 that is positioned immediately below the imager 202. The dryer 203 may be of a type of blowing hot air or a heating type such as a heater.

The imager 202 is a unit that determines whether or not an uneven pattern on the surface of the ink layer of the object 210 on the conveyor belt 205 positioned immediately below the imager 202 is stabilized, and acquires an image of the uneven pattern after it is stabilized. The imager 202 is also a unit that extracts the feature amount for individual identification from the acquired image of the uneven pattern, and outputs it to the controller 204.

The controller 204 is a unit that controls the entire identifier generation device 200. The controller 204 is connected with the generator 201, the imager 202, the dryer 203, the conveyor belt drive 206, the optical sensors 207 and 208, and the storage device 209 in a wired or wireless manner, and transmits a command thereto to thereby control the operations thereof, or receives a signal therefrom.

Figure 16:
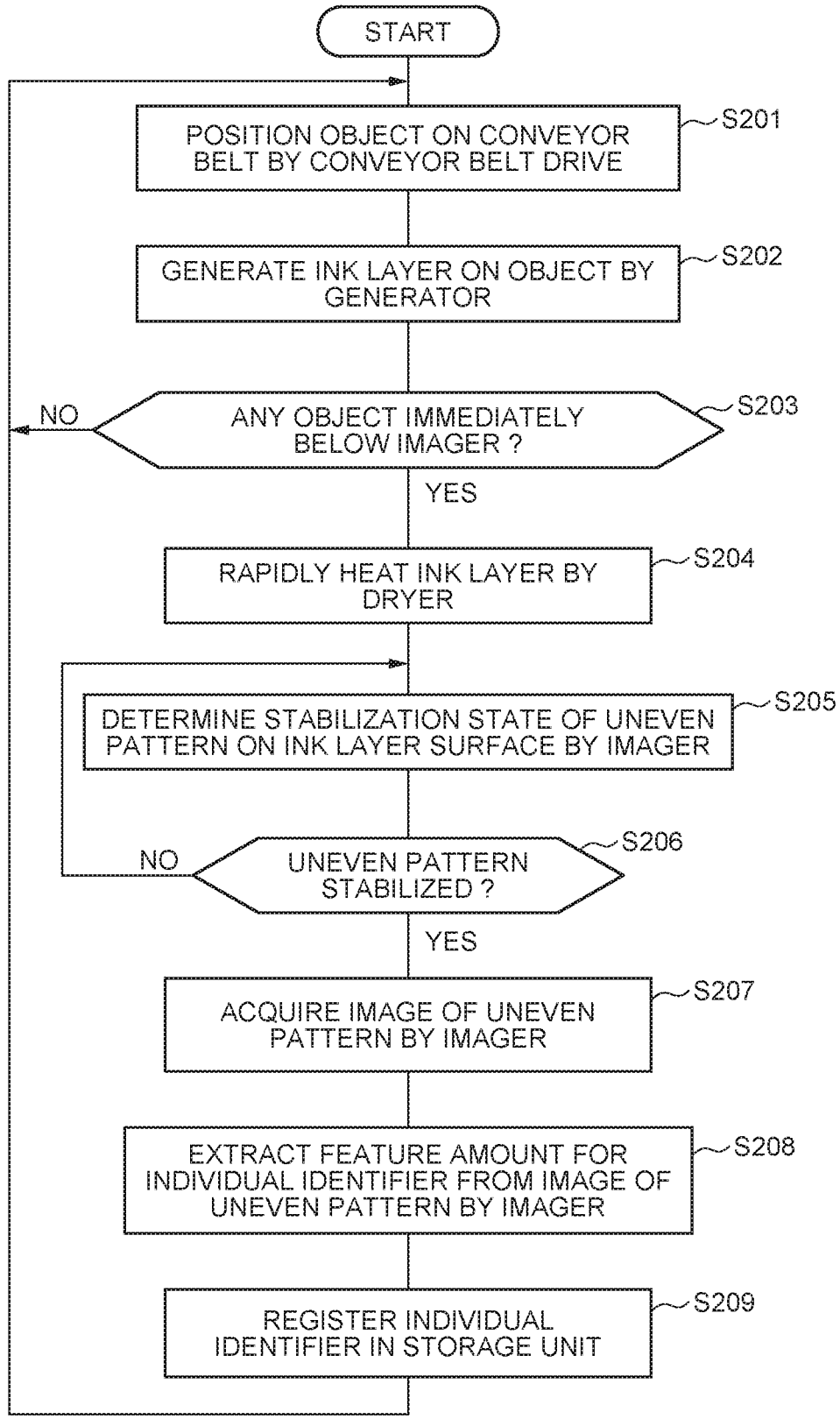
FIG. 16 is a flowchart illustrating a procedure of an identifier generation method performed with use of the identifier generation device according to the second exemplary embodiment of the present invention.

FIG. 16 is a flowchart illustrating an exemplary operation of an identifier generation method performed by the identifier generation device 200. Hereinafter, the identifier generation method according to the present embodiment will be described with reference to FIG. 16.

On the conveyor belt 205, a plurality of objects 210 are placed with a pitch that is equal to the interval between the generator 201 and the imager 202. The controller 204 issues a command to the conveyor belt drive 206 to drive the conveyor belt 205 by one pitch to thereby position one object 210 on the conveyor belt 205 immediately below the generator 201 (S201). The fact that the object 210 is positioned on the conveyor belt 205 immediately below the generator 201 is detected by the optical switch 207. At this time, the object 210 that has been present immediately below the generator 201 moves to a position immediately below the imager 202 in a state where the ink layer 211 is generated. The fact that the object 210 is positioned on the conveyor belt 205 immediately below the imager 202 is detected by the optical switch 208.

Then, the controller 204 issues a command to the generator 201 to thereby allow generation of the ink layer 211 on the object 210 on the conveyor belt 205 immediately below the generator 201 (S202). Specifically, in the case of using the generation unit 101 illustrated in FIG. 4 as the generator 201, the piston rod 154 is stroked downward by the drive unit 155 to thereby lower the ink supply unit 152 from the standby position to the ink supply position. Thereby, in the case where the ink supply unit 152 is of the ink pen type, the nib abuts the surface of the object 210 on the conveyor belt 205 and only one drop of ink is supplied to the surface of the object 210. In the case where the ink supply unit 152 is of the ink jet type, the tip portion of the ink jet nozzle is positioned at a height appropriate for jetting the ink. When the ink is jetted from the position, the ink is supplied to the surface of the object 210 on the conveyor belt 205. Thereafter, the piston rod 154 is raised by the drive unit 155, whereby the ink supply unit 152 is raised to the standby position.

Then, the controller 204 detects whether or not the object 210 on which the ink layer is generated is present immediately below the imager 202 at that point of time (S203). For example, the controller 204 determines that the object 210 on which an ink layer is generated is present immediately below the imager 202 when the object 210 is detected at a position immediately below the imager 202 by the optical sensor 208, and the object 210 has been detected at a position immediately below the generator 201 by the optical sensor 207 before being moved by one pitch and a command of generating an ink layer has been transmitted to the generator 201. Then, when the object 210 is not present immediately below the imager 202 at that point of time (S203), the control unit 204 returns to the processing of step S201. Meanwhile, when the object 210 is present immediately below the imager 202 at that point of time (S203), the control unit 204 first issues a command to the dryer 203 to allow high-temperature hot air to be blown to the ink layer 211 generated on the object 210 on the conveyor belt 205 immediately below the imager 202 (step S204).

Next, the controller 204 issues a command to the imager 202 to thereby first determine whether or not an uneven pattern on the surface of the ink layer 211 generated on the object 210 on the conveyor belt 205 immediately below the imager 202 is stabilized (S205). Then, when determining that the uneven pattern 211 is stabilized (S206), the controller 204 issues a command to the imager 202 to acquire an image of the uneven pattern generated on the object 210 on the conveyor belt 205 immediately below the imager 202 (S207). Then, the controller 204 issues a command to the imager 202 to thereby extracts the feature amount for individual identification from the acquired image of the uneven pattern 211 (S208). Then, the controller 204 registers the feature amount for individual identification extracted by the imager 202, in the storage device 209 as an individual identifier of the object 210 (S209). Then, the process returns to step S201. Determination of whether or not the uneven pattern is stabilized at step S205, acquisition of an image of the uneven pattern at step S207, extraction of the feature amount for individual identification at step S208, and registration of the individual identifier at step S209 are performed by a method similar to that described in the first exemplary embodiment.

As described above, according to the present exemplary embodiment, it is possible to perform processing such as generation of a pattern, drying of the pattern, and acquisition of an image of the pattern, for each feeding pitch on the upper surface of the conveyor belt 205.

Further, according to the present exemplary embodiment, as the ink layer 211 generated on the object 210 is rapidly heated and dried by the dryer 203, cratering phenomenon is likely to be caused. Therefore, a fine uneven pattern due to the cratering phenomenon can be formed sufficiently on the surface of the object 210.

Third Exemplary Embodiment

Figure 17:
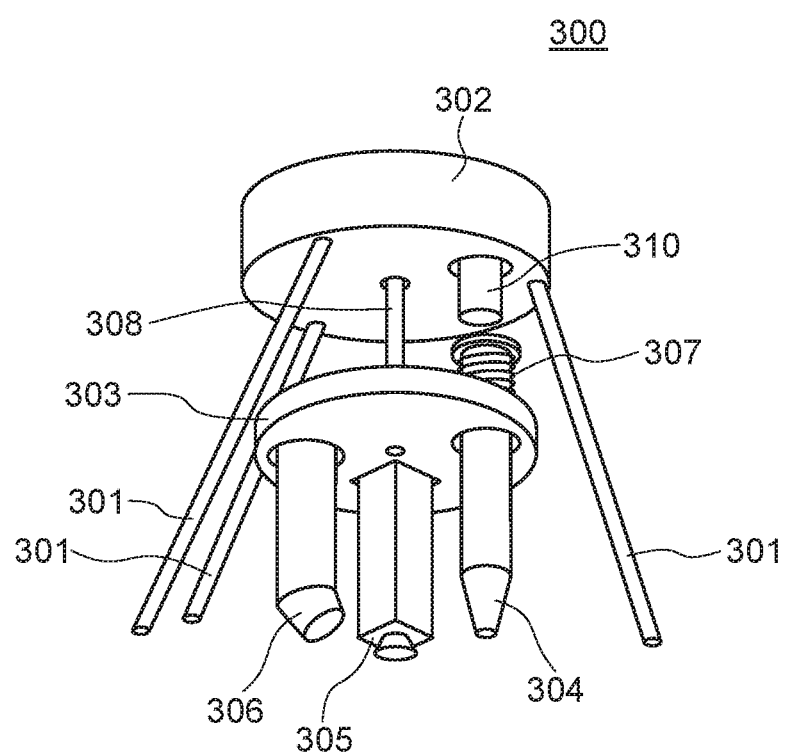
FIG. 17 is an external perspective view of an identifier generation device, when viewed from an obliquely lower side, according to a third exemplary embodiment of the present invention.
Figure 18:
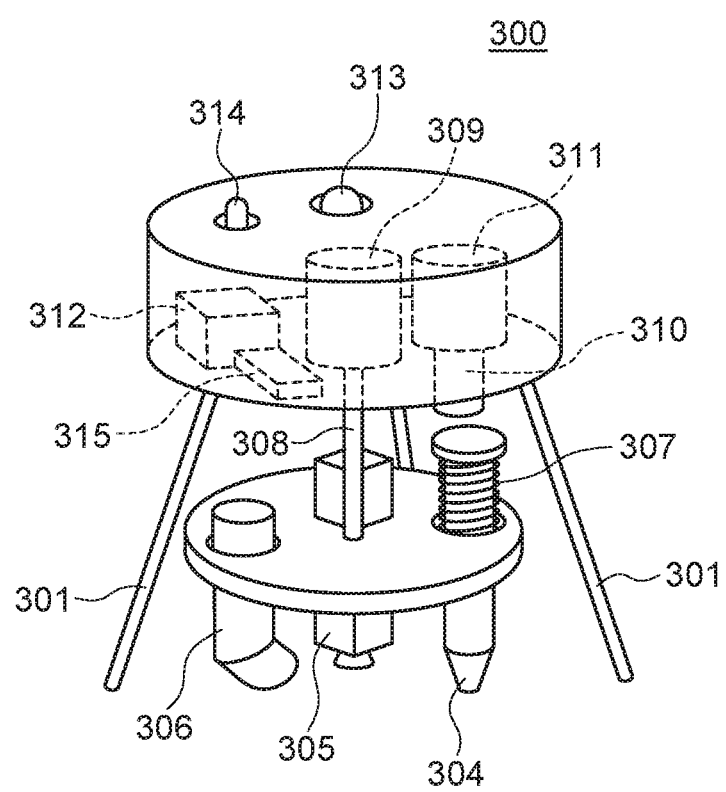
FIG. 18 is an external perspective view of the identifier generation device, when viewed from an obliquely upper side, according to the third exemplary embodiment of the present invention.

Referring to FIGS. 17 and 18, an identifier generation device 300 according to a third exemplary embodiment of the present invention is a portable identifier generation device that is compact and lightweight. The identifier generation device 300 includes an outer casing 302 of a hollow structure having three legs 301, a disk-shaped plate 303 provided rotatably relative to the outer casing 302, an ink supply unit 304 mounted on the plate 303, an imager 305, and a dryer 306. As the ink supply unit 304, an ink pen or an ink jet may be used, for example.

The ink supply unit 304, the imager 305, and the dryer 306 are mounted with predetermined intervals in the circumferential direction in the outer peripheral portion of the plate 303. Specifically, the ink supply unit 304, the imager 305, and the dryer 306 are mounted detachably into a plurality of through holes provided with predetermined intervals in the circumferential direction in the outer peripheral portion of the plate 303. The dryer 306 is mounted so as to be able to blow high-temperature hot air to an ink layer on an object that is present immediately below the imager 305. The ink supply unit 304 has a return spring 307 that constantly applies an upward elastic force to the ink supply unit 304. In a state where the outer casing 302 is disposed on a plane with use of the three legs 301, the length and the attachment angle of the three legs 301 are adjusted such that the lower ends of the ink supply unit 304, the imager 305, and the dryer 306 come to positions away from the plane by predetermined distances.

The outer casing 302 includes therein a stepping motor 309 connected to a rotary shaft 308 of the plate 303, a drive unit 311 that moves a piston rod 310 of the cylinder in an up and down direction, a controller 312 that controls the entire identifier generation device 300, and a battery 315 that supplies electric power to the respective units. The piston rod 310 of the drive unit 311 is mounted at a position away from the rotary shaft 308 by the same distance as the distance between the ink supply unit 304 and the rotary shaft 308. Further, on the upper surface of the outer casing 302, an operation button 313 and an LED 314 are provided.

The controller 204 is connected with the ink supply unit 304, the imager 305, the dryer 306, the stepping motor 309, the drive unit 311, the operation button 313, and the LED 314 by signal lines, and exchanges signals and commands with them to thereby control operation thereof and receives signals therefrom. The rotary shaft 308 may have a hollow structure, and the signal lines and the power lines connecting the controller 204 and the battery 315 and the ink supply unit 304, the imager 305, and the dryer 306 may be routed via the interior of the rotary shaft 308. Further, the controller 204 includes a wireless interface for registering an individual identifier of an object extracted by the imager 305 in an external storage device not illustrated.

Figure 19:
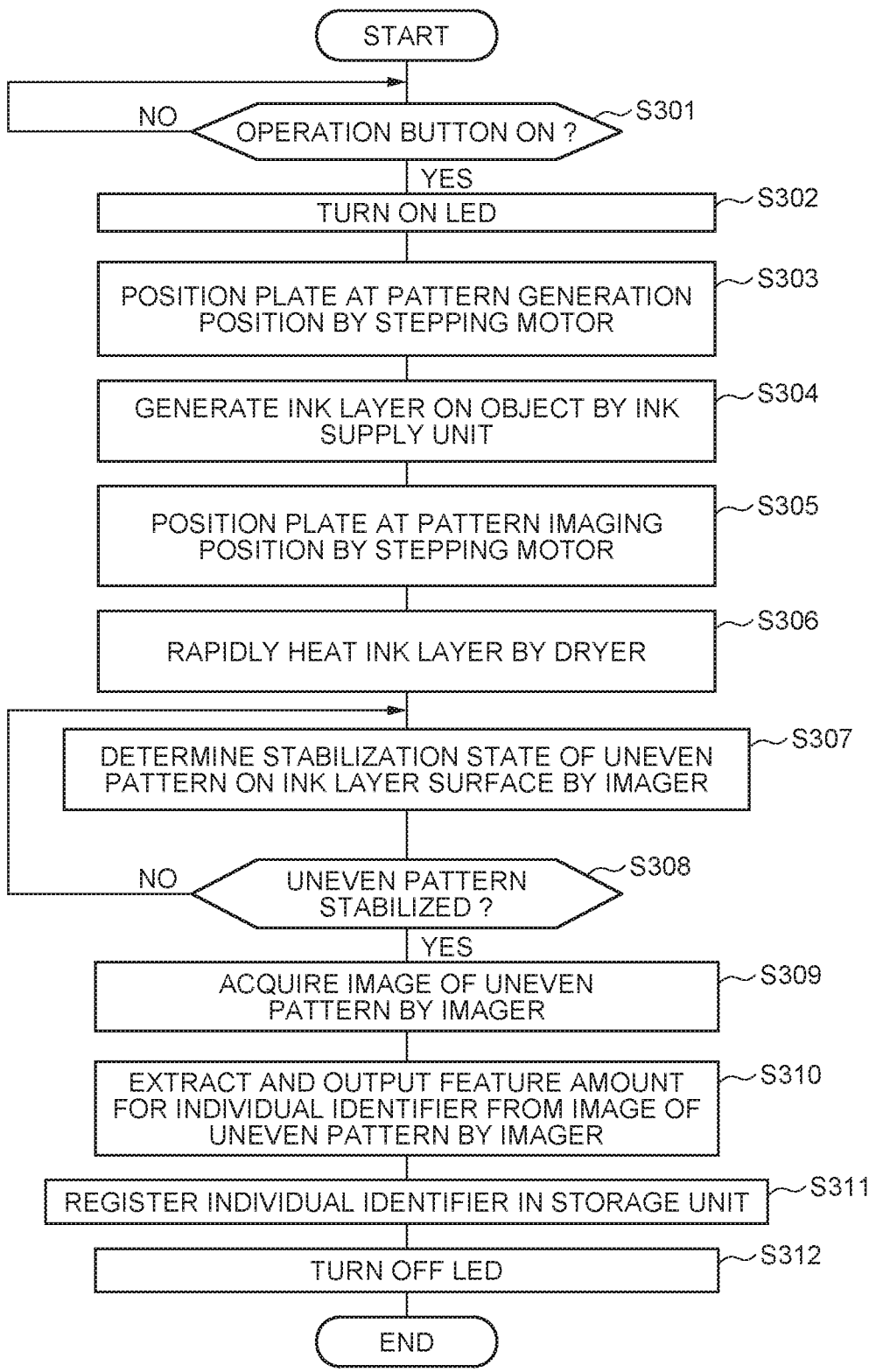
FIG. 19 is a flowchart illustrating a procedure of an identifier generation method performed with use of the identifier generation device according to the third exemplary embodiment of the present invention.

FIG. 19 is a flowchart illustrating an exemplary operation of an identifier generation method performed by the identifier generation device 300. Hereinafter, the identifier generation method according to the present embodiment will be described with reference to FIG. 19.

In the case of generating an uneven pattern on an object, acquiring an image of the generated uneven pattern, and extracting an individual identifier from the acquired image of the uneven pattern, a user places the legs 301 of the outer casing 302 on the surface of the object on which a pattern is to be generated. Then, the user turns on the operation button 313.

When the operation button 313 is turned on (S301 in FIG. 19), the controller 312 turns on the LED 314 to inform the user that it is in operation (S302). Next, the controller 312 issues a command to the stepping motor 309 to position the plate 303 at a pattern generation position (S303). The pattern generation position is a position where the ink supply unit 304 comes immediately below the piston rod 310. Next, the controller 312 generates an ink layer on the object by the ink supply unit 304 (S304). Specifically, the controller 312 issues a command to the drive unit 311 to lower the piston rod 310 by a predetermined amount. Thereby, the ink supply unit 304 is pushed by the piston rod 310 and is lowered to the ink supply position against the elastic force of the return spring 307. Therefore, when the ink supply unit 304 is an ink pen, the nib abuts the surface of the object and the ink is supplied to the surface of the object. Further, in the case where the ink supply unit 304 is of the ink jet type, the tip portion of the ink jet nozzle is positioned at a height appropriate for jetting the ink. When the ink is jetted from the ink jet nozzle according to a command from the controller 312, the ink is supplied to the surface of the object. When generation of an ink layer is completed, the controller 312 issues a command to the drive unit 311 to raise the piston rod 310 to the original position. When the piston rod 310 is raised, the ink supply unit 304 is raised by the elastic force of the return spring 307.

Next, the controller 312 issues a command to the stepping motor 309 to position the plate 303 at a pattern imaging position (S305). The pattern imaging position is a position where the imager 305 comes immediately below the piston rod 310. Next, the controller 312 drives the dryer 306 to blow high-temperature hot air to the generated pattern (S306). Then, the controller 312 issues a command to the imager 305 to determine whether or not the generated uneven pattern is stabilized (S307). Then, when determining that the uneven pattern is stabilized (S308), the controller 312 issues a command to the imager 305 to acquire an image of the generated uneven pattern (S309). Then, the controller 312 issues a command to the imager 305 to extract the feature amount for individual identification from the acquired image of the pattern (S310). Then, the controller 312 registers the extracted feature amount in a storage device, not illustrated, as an individual identifier of the object (S311). Determination of whether or not the uneven pattern is stabilized at step S307, acquisition of an image of the uneven pattern at step S309, extraction of the feature amount for individual identification at step S310, and registration of the individual identifier at step S311 are performed by a method similar to that described in the first exemplary embodiment.

Next, the controller 312 turns off the LED 314 to inform the user that the operation is completed (S312). Then, the controller 312 ends the process of FIG. 19. It is also possible to have a configuration that before the end of the process of FIG. 19, the controller 312 issues a command to the stepping motor 309 to position the plate 303 at the pattern generation position.

As described above, according to the present embodiment, it is possible to provide the portable individual identifying device 300 in which an uneven pattern can be generated on an object with an easy operation regardless of time and place, and the feature amount for individual identification can be extracted from an image obtained by imaging the uneven pattern.

Fourth Exemplary Embodiment

Figure 20:
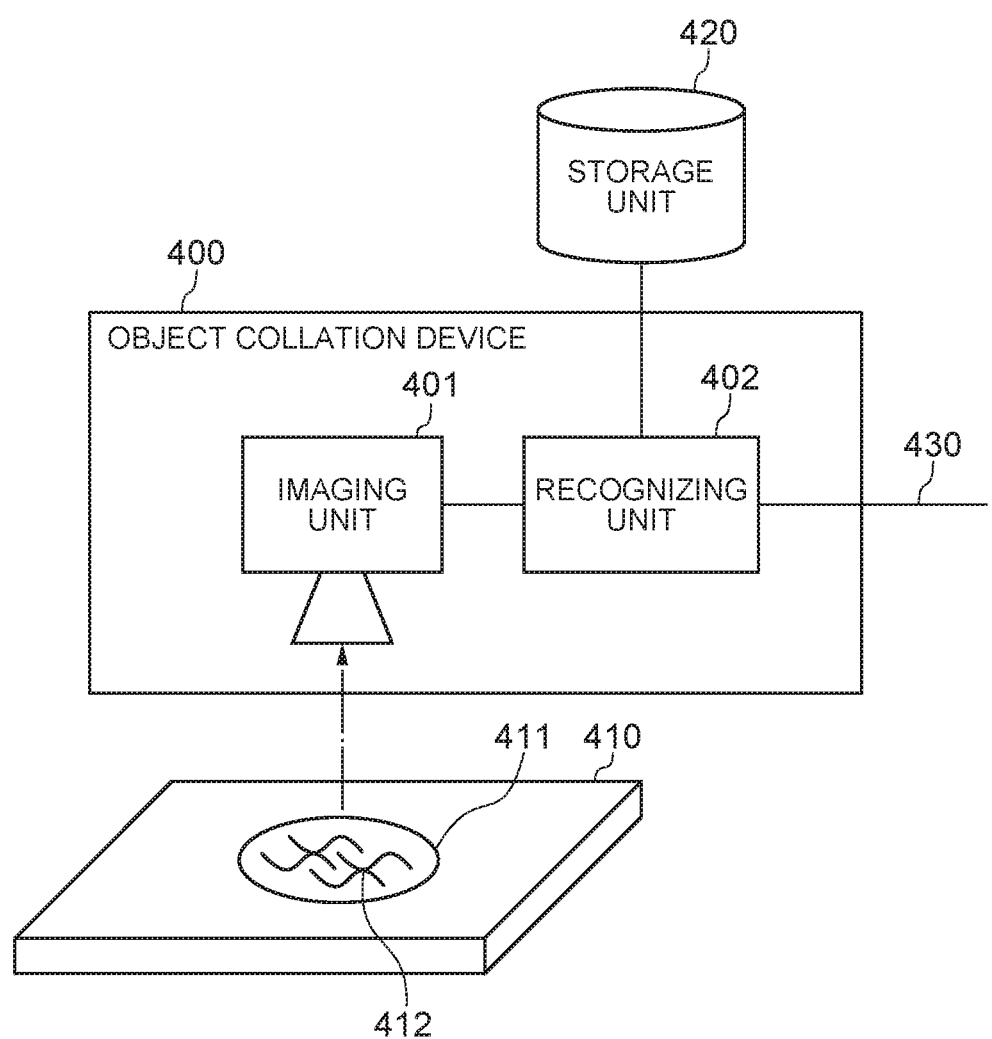
FIG. 20 is a diagram illustrating an exemplary configuration of an object collation device according to a fourth exemplary embodiment of the present invention.

Referring to FIG. 20, an object collation device 400 according to a fourth exemplary embodiment of the present invention has a function of performing identification and collation of an object 410.

The object 410 is an object that is a target of identification and collation such as an industrial product or a product packaging. FIG. 20 illustrates only one object 410 on which identification and collation is to be performed. However, a large number of objects 410 are subjected to identification and collation in general. In that case, a large number of objects 410 may be a set of objects of the same type having the same outer shape (such as certain electronic components produced on a production line), or a mixture of sets of objects of different types having different outer shapes and sizes (for example, electronic components or the like having different outer shapes and different functions produced in different production lines).

On one surface of the object 410, an ink layer 411 is formed. Such an ink layer 411 is one formed on the object 410 by the identifier generation device 100, 200 or 300 according to the first to third embodiments of the present invention, for example.

The object collation device 400 includes an imaging unit 401 and a recognizing unit 402 as main functional units.

The imaging unit 401 has a function of imaging an uneven pattern 412 to acquire an image of an uneven pattern 412 on the surface of an ink layer 411 formed on the object 410. The imaging unit 401 also has a function of extracting an individual identifier from the acquired image of the uneven pattern 412.

The recognizing unit 402 has a function of comparing the individual identifier of the object 410 extracted by the imaging unit 401 with the individual identifier of a registered object stored in the storage unit 420, and based on the comparison result, performing determination of identification and collation of the object. In the storage unit 420, an individual identifier of a registered object is stored in advance with use of the individual identifier registration device 100, 200, or 300 according to the first to third of the present invention.

Figure 21:
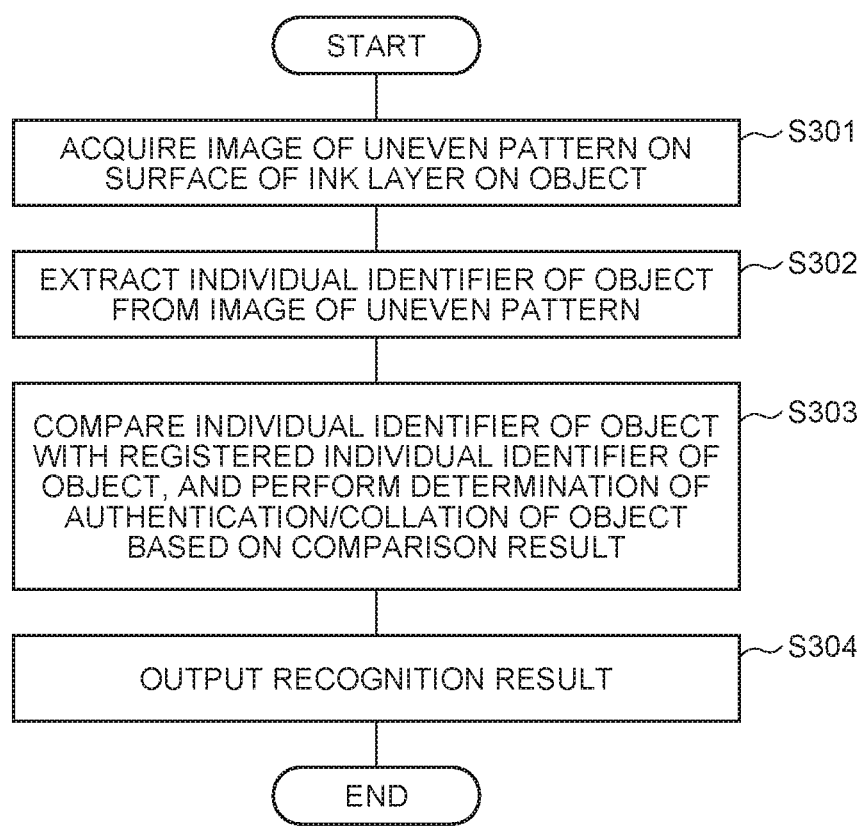
FIG. 21 is a flowchart illustrating a procedure of an object collation method performed with use of the object collation device according to the fourth exemplary embodiment of the present invention.

FIG. 21 is a flowchart illustrating a procedure of an object collation method performed by using the object collation device 400. Hereinafter, the object collation method according to the present embodiment will be described with reference to FIGS. 20 and 21.

First, the imaging unit 401 of the object collation device 400 images the uneven pattern 412 on the surface of the ink layer 411 formed on the object 410, to acquire an image of the uneven pattern 412 (step S301). Then, the imaging unit 401 extracts, from the acquired image of the uneven pattern 412, the feature quantity that depends on the uneven pattern 412, as an individual identifier of the object 410 (step S302).

Next, the recognizing unit 402 of the object collation device 400 compares the extracted individual identifier of the object 410 with the individual identifier of the registered object stored in the storage unit 420, and based on the comparison result, performs identification and collation of the object (step S303). In the case where an individual identifier is an N-dimensional vector, the recognizing unit 402 calculates the similarity (or distance) between the vectors of the individual identifier of the object 410 and the individual identifier of the registered object, and when the similarity equals to or larger than a threshold (when the distance equals to or smaller than a threshold), the recognizing unit 402 determines that the two individual identifiers are the same. Otherwise, it determines that they are not the same. The recognizing unit 402 ends repetition of identification and collation of the object under the condition that an individual identifier of a registered object that is the same as the individual identifier of the object 410 is found, or comparison with the individual identifiers of all registered objects is completed, whichever earlier. Then, the recognizing unit 402 outputs a recognition result 430. The recognition result 430 may represent presence or absence of successful identification and collation. When it succeeded, the recognition result 430 may have an attribute value of the object stored in the storage unit 320 corresponding to the individual identifier of the registered object determined to be the same. The recognition result 430 may be displayed on a display device not illustrated, or may be stored in a storage device not illustrated.

Figure 22:
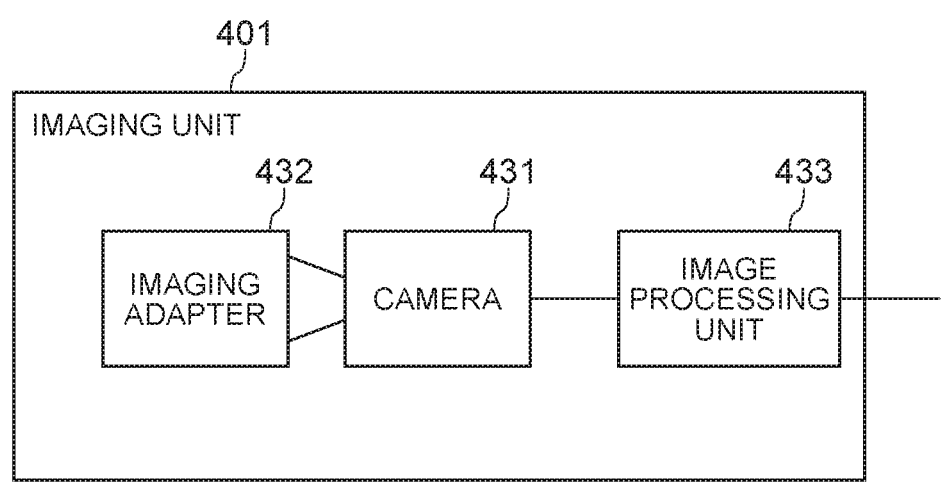
FIG. 22 is a diagram illustrating an exemplary configuration of an imaging unit of the object collation device according to the fourth exemplary embodiment of the present invention.

FIG. 22 is a block diagram illustrating an example of the imaging unit 401. The imaging unit 401 of this example includes a camera 431, an imaging adapter 432, and an image processing unit 433. The image processing unit 433 may be implemented by the computer 500, including the arithmetic processing unit 501 and the storage unit 502, and the program 503 as illustrated in FIG. 7, besides a dedicated hardware. The program 503 is read by the computer 500 when the computer 500 is started or the like, and controls operation of the computer 500 to thereby implement the image processing unit 433 on the computer 500.

The imaging adapter 432 is a photographing auxiliary tool that is used by being mounted on the camera 431 in order to highlight local inclination of the uneven pattern 412 on the surface of the ink layer 411 as shadows so that the uneven pattern 412 can be imaged stably. As the imaging adapter 432, the photographing auxiliary tool described in Patent Document 1 may be used, for example. Examples of other preferable configurations of the imaging adapter 432 will be described below.

The camera 431 may be configured of a camera using a CCD image sensor or a CMOS image sensor, for example. The camera 431 captures the uneven pattern 412 on the surface of the ink layer 411 formed on the object 410 as a color image or a monochrome image, through the imaging adapter 432 attached thereto. The camera 431 outputs the image of the uneven pattern 412, obtained by imaging, to the image processing unit 433.

The image processing unit 433 has a function of acquiring an image of the uneven pattern 412 on the surface of the ink layer 411 on the object 410 with use of the camera 431, and extracting the feature quantity that depends on the uneven pattern 412 as an individual identifier of the object 410.

Hereinafter, the imaging adapter 432 and the image processing unit 433 will be described in detail.

<First Exemplary Configuration of Imaging Adapter>

Figure 23:
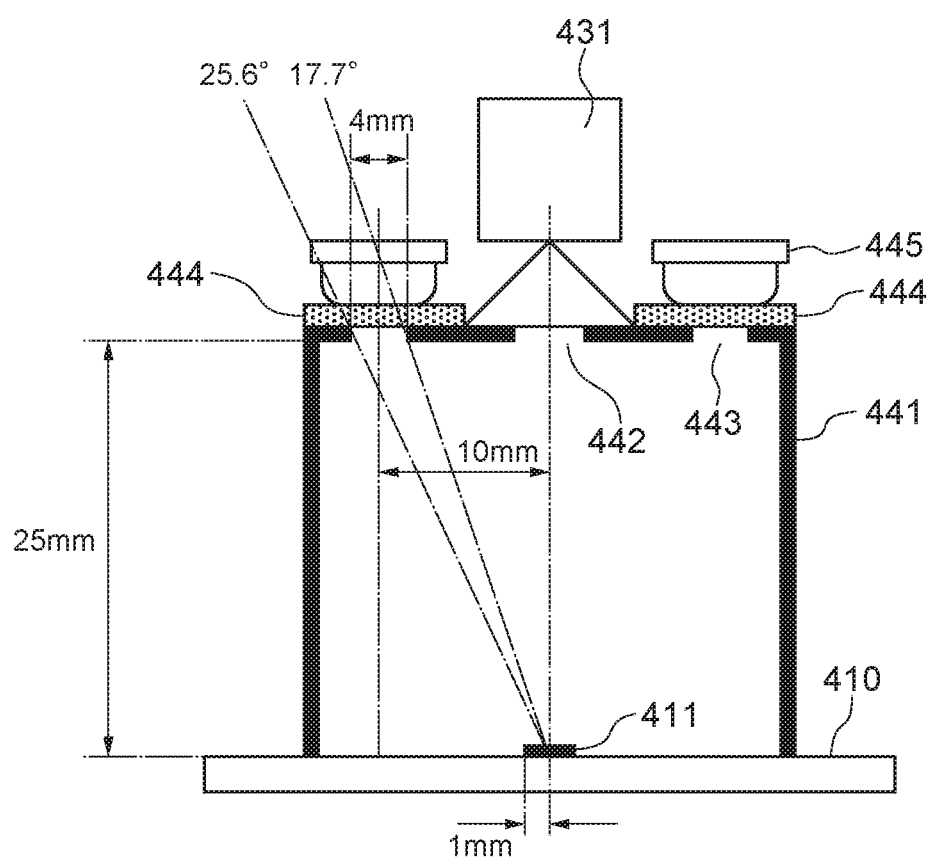
FIG. 23 is a side view illustrating an example of a first configuration of an imaging adapter provided to the imaging unit of the object collation device according to the fourth exemplary embodiment of the present invention.
Figure 24:
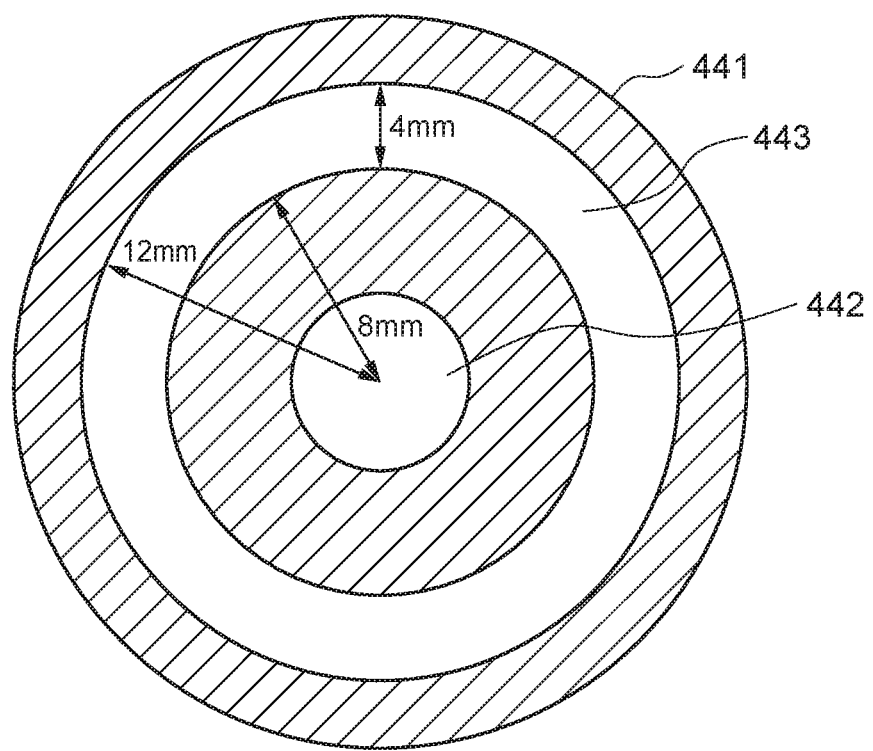
FIG. 24 is a plan view of a casing of the example of the first configuration of the imaging adapter provided to the imaging unit of the object collation device according to the fourth exemplary embodiment of the present invention.

FIG. 23 is a side view illustrating a first exemplary configuration of the imaging adapter 412. The imaging adapter 412 of this example includes a housing 441 formed of cylindrical black plastic having an opening at the lower end. The inner diameter of the housing 441 is approximately 28 mm, and the distance from the lower end of the housing 441 to the inside of the upper surface is approximately 25 mm. As shown in FIG. 24 illustrating an example of a plane of the housing 441, the upper surface of the housing 441 has an opening 442 in a central portion, and a portion in a radius of 8 to 12 mm from the center is hollowed out as a donut-shaped opening 443 of 4 mm width. The camera 431 is mounted in a direction of imaging the lower side from the opening 442 in the central portion. Further, a diffusion plate 444 made of milky white plastic is attached to the upper surface of the housing 441 so as to cover the donut-shaped opening 443. Furthermore, a ring-shaped light source 445 that emits light toward the diffusion plate 444 is attached to the upper surface of the diffusion plate 444. This realizes a rotationally symmetric light source with which the portion of the donut-shaped opening 443 as illustrated in FIG. 24 is lighted up.

Figure 25:
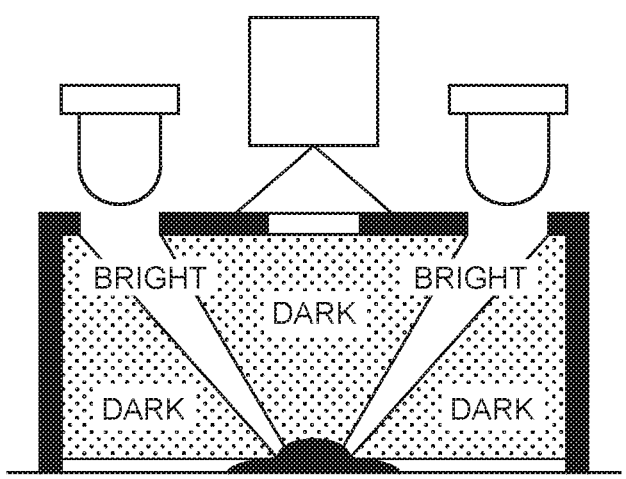
FIG. 25 is a diagram for explaining an action of a first exemplary configuration of an imaging adapter provided to an imaging unit of the object collation device according to the fourth exemplary embodiment of the present invention, which is a schematic diagram illustrating a bright and dark state when the inner surface of the imaging adapter is observed from the ink layer.
Figure 26:
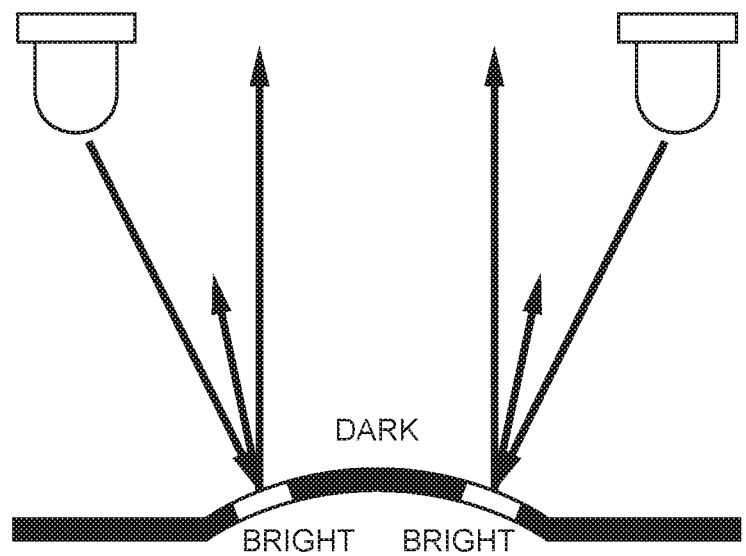
FIG. 26 is a diagram schematically illustrating specular reflection light by light projected from four upper oblique sides to the ink layer.

In the case of imaging the ink layer 411 formed on the object 410 by the camera 431, the housing 441 is pressed against the object 410 such that the ink layer 411 is positioned at a lower end central portion of the housing 441. The size of the ink layer 411 is about 2 mm at maximum. At this time, by the emitted light from the donut-shaped opening 443 by the ring-shaped light source 445, a zenith angle arctan (8.0/25) to arctan (12.0/25) with respect to the central portion of the ink layer 411, that is, an angular range from 17.7° to 25.6° is bright, and the rest is dark. Further, the opening 442 in the upper surface of the housing 441 is closed by the camera 431, and the inner surface of the housing 441 other than the donut-shaped opening 443 is a black area by the black plastic. Therefore, when the inner surface of the housing 441 is observed from the ink layer 411, the bright and dark state of the inner surface is as illustrated in the schematic diagram of FIG. 25. Thus, by blocking the light made incident on the ink layer 411 from a low angle, it is possible to reduce the diffuse reflection light caused by such low-angle light. As a result, as illustrated in the schematic diagram of FIG. 26, it is possible to relatively emphasize the specular reflection light by the light emitted to the ink layer 411 from four oblique sides above it.

Figure 27:
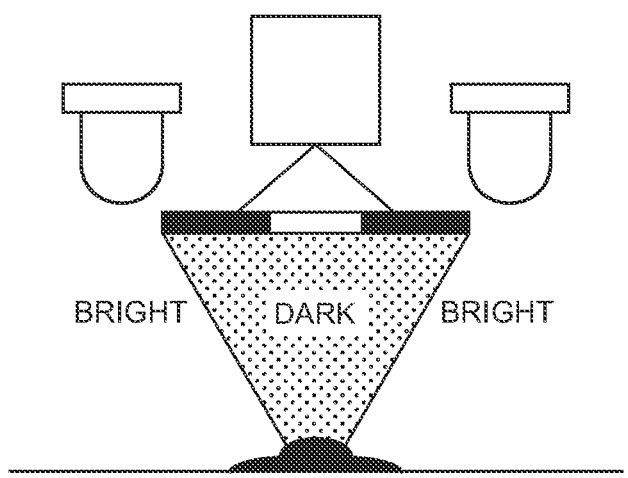
FIG. 27 is a diagram for explaining an action of a photographing auxiliary tool described in Patent Document 1, which is a schematic diagram showing a bright and dark state when the inner surface of the photographing auxiliary tool is observed from the ink layer.

In contrast, the photographing auxiliary tool described in Patent Document 1 uses a covering portion in which a partial surface corresponding to the inside of a predetermined angular range from the normal direction directly opposing a predetermined area on the object surface is black, and the surface corresponding to the other angular range is a light source area surface that diffuses and emits light emitted from the light source unit. Accordingly, when the photographing auxiliary tool described in Patent Document 1 is used, the bright and dark state observed from the ink layer 411 becomes that illustrated in the schematic diagram of FIG. 27. Therefore, it is difficult to block the light made incident on the ink layer 411 from a low angle.

In the exemplary configuration of FIG. 23, the camera 431 images the ink layer 411 from a distance of approximately 25 mm. For example, assuming that the size of the captured image is VGA (640×480 pixels) and the imaging resolution is 100 to 160 pixels/mm, 1 to 1.6 pixels/10 µm is obtained. Accordingly, a cratering pattern having a diameter of 10 µm or larger can be taken at least in one pixel. That is, a cratering pattern can be imaged as a bright and dark pattern.

In FIG. 23, black plastic is used for the housing 441. However, the material is not limited to black plastic as long as the material does not transmit and reflect light. Another material such as paper may also be used. It is also possible to make the housing 441 of a material such as transparent or translucent plastic, and paint the portion corresponding to black plastic in FIG. 23 to be black, to thereby have a structure having a function similar to that of the housing 441 in FIG. 23. Furthermore, it is also possible to use milky plastic on the entire surface of the casing 441 and paint the portion corresponding to the black plastic in FIG. 23 to be black, to thereby realize a similar structure. In that case, the milky plastic 444 may be omitted.

As the light source 445, an LED ring light may be used, for example, but is not limited thereto. It is desirable that a wavelength band of light emitted from the light source 445 is a wavelength band having low reflectance of the ink layer 411. That is, it is desirable that the light source 445 is a light source having the radiation intensity in which spectral distribution is relatively high in a wavelength band of relatively low spectral reflectance in the spectral reflectance characteristics of the ink layer 411. Specifically, in the case where the ink layer 411 is formed with use of a blue ink, a red light source is desirable. By doing so, it is possible to suppress an influence of light components diffused and reflected by the ink layer 411. As a result, it is possible to emphasize the light components subjected to specular reflection at the surface of the ink layer 411. It is desirable that the camera 431 to be combined with the light source 445 having a wavelength band in which reflectance of the ink layer 411 is low is a monochrome camera.

<Second Exemplary Configuration of Imaging Adapter>

Figure 28:
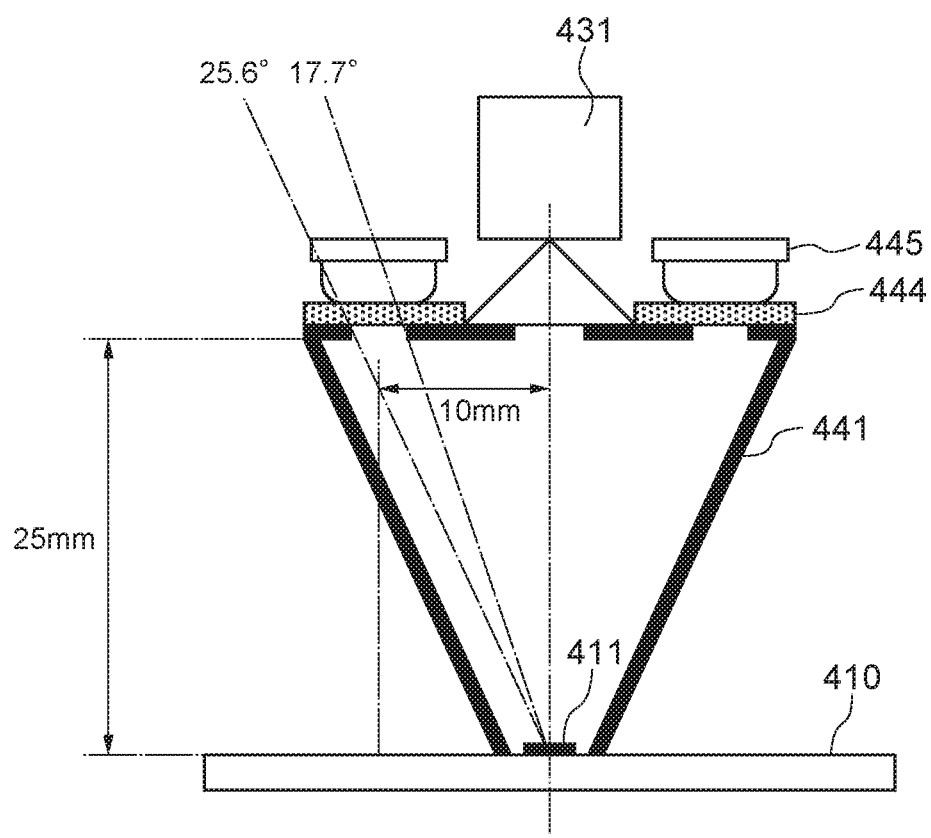
FIG. 28 is a side view illustrating a second exemplary configuration of the imaging adapter provided to the imaging unit of the object collation device according to the fourth exemplary embodiment of the present invention.

FIG. 28 is a side view illustrating a second exemplary configuration of the imaging adapter 412. The imaging adapter 412 illustrated in FIG. 28 has the housing 441 that is in a conical shape narrowing toward the lower end. In this point, the imaging adapter 412 is different from the imaging adapter illustrated in FIG. 23 in which the width of the lower end and that of the upper end are the same. The other configurations are the same as those illustrated in FIG. 23.

In the imaging adapter 412 illustrated in FIG. 28, at the time of imaging, it is easy to align the ink layer 411 and the tip (lower end) of the imaging adapter 412. Also, the imaging adapter 412 has an advantage that even when a surface of the object 410 is a curved surface, imaging can be made by pressing it against the curved surface.

<Third Exemplary Configuration of Imaging Adapter>

Figure 29:
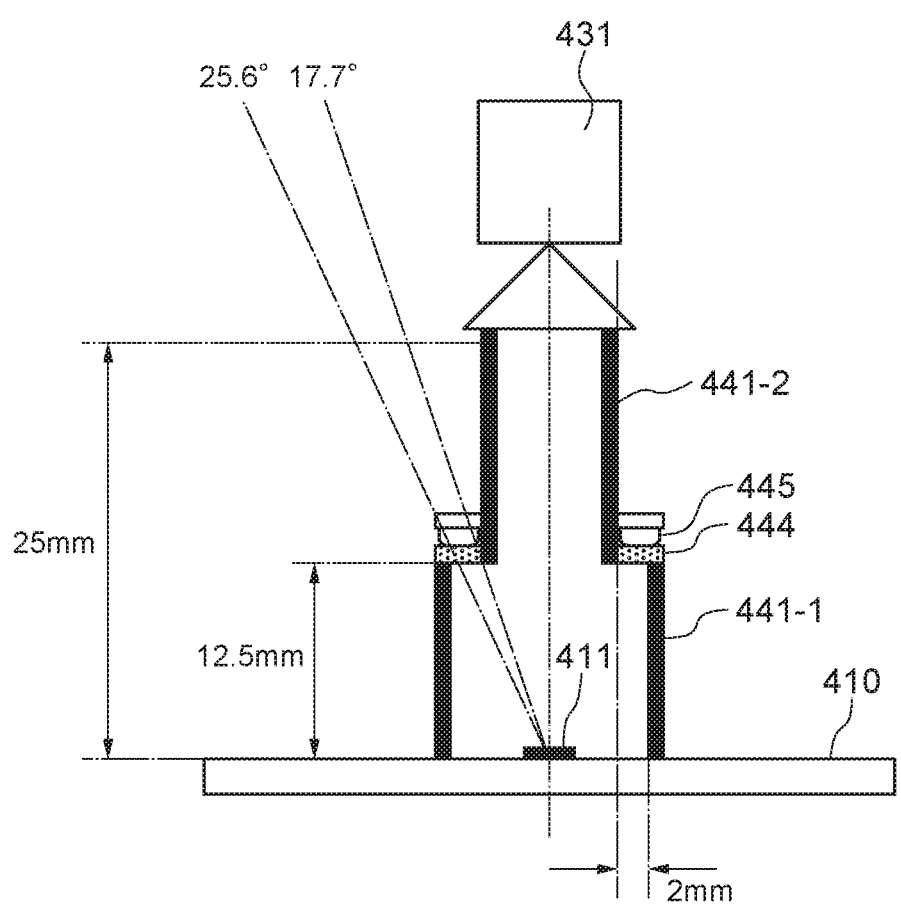
FIG. 29 is a side view illustrating a third exemplary configuration of the imaging adapter provided to the imaging unit of the object collation device according to the fourth exemplary embodiment of the present invention.

FIG. 29 is a side view illustrating a third exemplary configuration of the imaging adapter 412. In the imaging adapter 412 illustrated in FIG. 29, the position of the light source 445 is made closer to the ink layer 411 while keeping the distance between the camera 431 and the ink layer 411, and the housing 441 is configured of two housings namely a lower-side housing 441-1 and an upper-side housing 441-2 having different outer shapes and different inner diameters. In this point, the imaging adapter 412 is different from the imaging adapter illustrated in FIG. 23 that is configured of one housing. The other configurations are the same as those illustrated in FIG. 23.

The lower housing 441-1 has a cylindrical shape having openings at a lower end and an upper end, and the height is approximately 12.5 mm. On the upper end of the lower housing 441-1, a diffusion plate 444 in which the outer shape is in a donut shape that is the same as the outer shape of the lower housing 441-1 is mounted horizontally. Further, on the inner side of the diffusion plate 444, the upper housing 441-2 in which the outer shape thereof is equal to the inner diameter of the diffusion plate 444 stands so as not to protrude into the lower housing 441-1. Furthermore, the light source 445 in a donut shape is mounted on the diffusion plate 444. At least a portion of 2 mm wide of the lower surface of the diffusion plate 444 is exposed into the lower housing 441-1.

The imaging adapter 412 illustrated in FIG. 29 has an advantage that the size of the adapter can be reduced as compared with the imaging adapter 412 illustrated in FIG. 23.

<Fourth Exemplary Configuration of Imaging Adapter>

Figure 30:
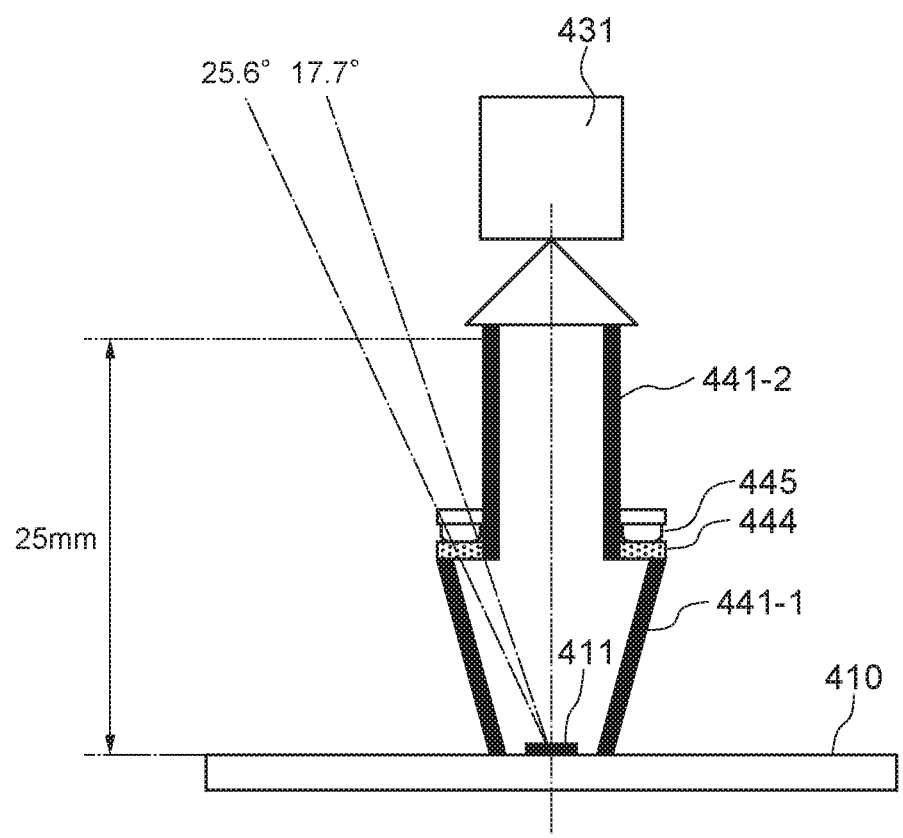
FIG. 30 is a side view illustrating a fourth exemplary configuration of the imaging adapter provided to the imaging unit of the object collation device according to the fourth exemplary embodiment of the present invention.

FIG. 30 is a side view illustrating a fourth exemplary configuration of the imaging adapter 412. The imaging adapter 412 illustrated in FIG. 30 has the lower housing 441-1 that is in a conical shape narrowing toward the lower end. In this point, the imaging adapter 412 is different from the imaging adapter illustrated in FIG. 29 in which the width of the lower end and that of the upper end are the same. The other configurations are the same as those illustrated in FIG. 29.

In the imaging adapter 412 illustrated in FIG. 30, at the time of imaging, it is easy to align the ink layer 411 and the tip (lower end) of the imaging adapter 412. Also, the imaging adapter 412 has an advantage that even when a surface of the object 410 is a curved surface, imaging can be made by pressing it against the curved surface.

<Fifth Exemplary Configuration of Imaging Adapter>

Figure 31:
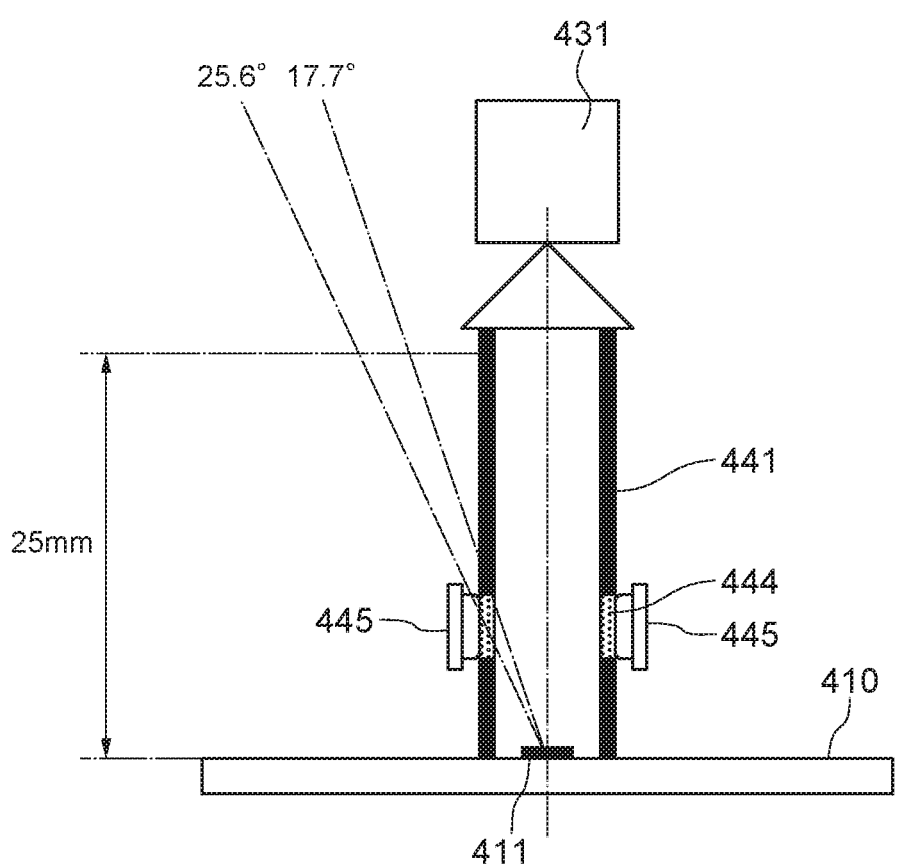
FIG. 31 is a side view illustrating a fifth exemplary configuration of the imaging adapter provided to the imaging unit of the object collation device according to the fourth exemplary embodiment of the present invention.

FIG. 31 is a side view illustrating a fifth exemplary configuration of the imaging adapter 412. The imaging adapter 412 illustrated in FIG. 31 has a structure in which a portion of the side surface of the cylindrical housing 441 is configured of the diffusion plate 444 and the ring-shaped light source 445 is attached to the outer peripheral surface of the diffusion plate 444. In this point, the imaging adapter 412 is different from the imaging adapter illustrated in FIG. 23 in which the diffusion plate 444 and the ring-shaped light source 445 are attached to the peripheral portion of the upper surface of the cylindrical housing 441. The other configurations are the same as those of the imaging adapter illustrated in FIG. 23.

The imaging adapter 412 illustrated in FIG. 31 has an advantage that the outer shape thereof can be narrower. Note that since the diffusion plate 444 is attached to the side surface of the cylindrical housing 441, the light directly made incident on the camera 431 from the diffusion plate 444 is increased. However, the amount of such direct incident light is always constant. Therefore, it is easily removable it as a bias.

<Sixth Exemplary Configuration of Imaging Adapter>

Figure 32:
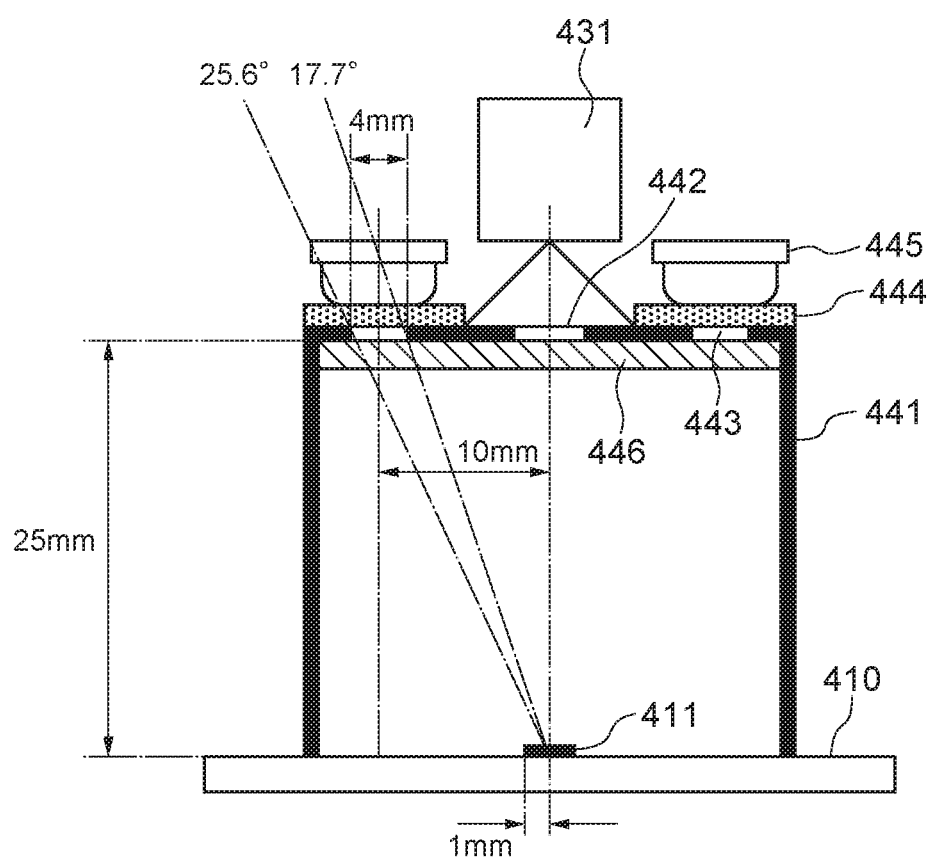
FIG. 32 is a side view illustrating a sixth exemplary configuration of the imaging adapter provided to the imaging unit of the object collation device according to the fourth exemplary embodiment of the present invention.

FIG. 32 is a side view illustrating a sixth exemplary configuration of the imaging adapter 412. The imaging adapter 412 illustrated in FIG. 32 has a structure in which a circular polarizing filter 446 is attached to the inside of the upper surface of the housing 441 so as to cover the openings 442 and 443. In this point, the imaging adapter 412 is different from the imaging adapter illustrated in FIG. 23 not having such a polarizing filter 446. The other configurations are the same as those of the imaging adapter illustrated in FIG. 23.

The polarizing filter 446 is a linear polarizing plate that converts the light, having passed through it, into light that oscillates in only one direction. When the polarizing filter 446 is attached to the housing 441 so as to cover the opening 442, the light emitted from the light source 445 through the diffusion plate 444 passes through the polarizing filter 446 and becomes linearly polarized light, and is projected to the ink layer 411. Further, when the polarizing filter 446 is attached to the housing 441 so as to cover the opening 442, the camera 431 receives the light that is specularly reflected at the surface of the ink layer 411 and has passed through the polarizing filter 446. At this time, the portion covering the opening 443 of the polarizing filter 446 acts as a polarizer, the portion covering the opening 442 acts as an analyzer. The polarizer and the analyzer satisfy conditions of parallel nicols. Accordingly, in the light projected from the light source 445 through the polarizing filter 446, the light component subjected to specular reflection at the ink layer 411 is received by the camera 431 through the polarizing filter 446. However, the light component diffused and reflected is cut off by the polarizing filter 446, whereby it can be prevented from being received by the camera 431.

Since the imaging adapter illustrated in FIG. 32 has the polarizing filter 446, it is possible to reduce the diffused reflection light input to the camera 431, and consequently, to relatively emphasize the specular reflection light by the ink layer 411.

Further, since a single polarizing filter 446 is used as the polarizer and the analyzer that satisfy parallel nicols, the configuration is simplified. However, instead of the single polarizing filter 446, a polarizer in a donut shape that covers the opening 443 and an analyzer that covers the opening 442 may be used.

<Seventh Exemplary Configuration of Imaging Adapter>

Figure 33:
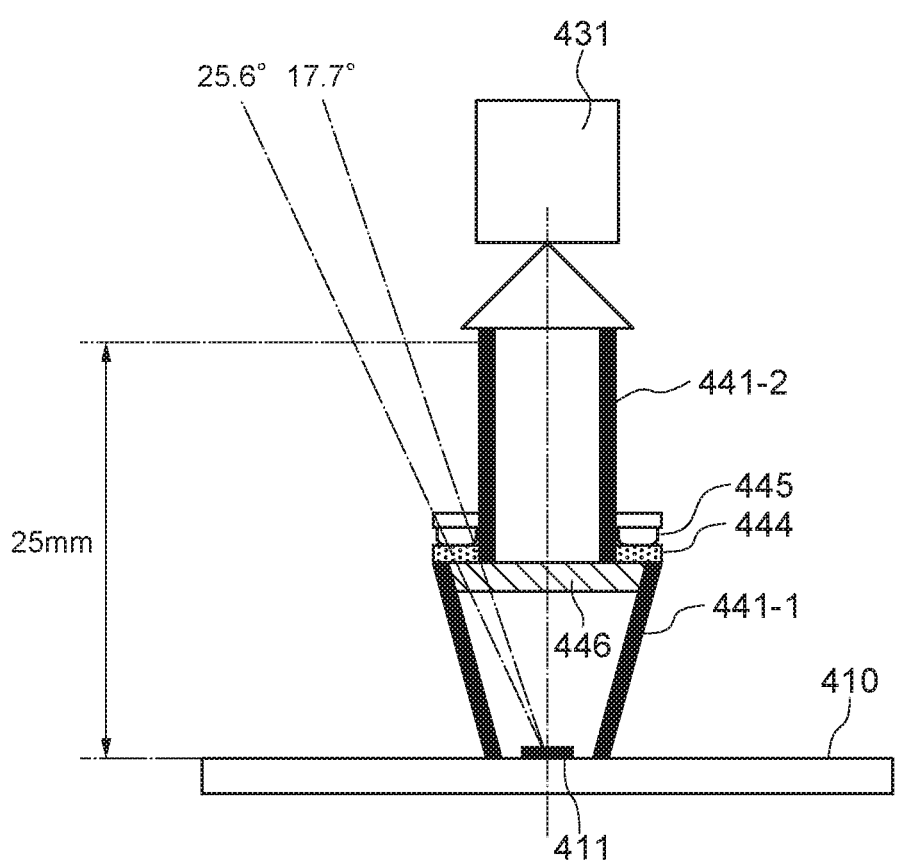
FIG. 33 is a side view illustrating a seventh exemplary configuration of the imaging adapter provided to the imaging unit of the object collation device according to the fourth exemplary embodiment of the present invention.

FIG. 33 is a side view illustrating a seventh exemplary configuration of the imaging adapter 412. The imaging adapter 412 illustrated in FIG. 33 has a structure in which a circular polarizing filter 446 is attached so as to cover the diffusion plate 444 and the lower opening of the upper housing 441-2. In this point, the imaging adapter 412 is different from the imaging adapter illustrated in FIG. 30 not having such a polarizing filter 446. The other configurations are the same as those of the imaging adapter illustrated in FIG. 30.

When the polarizing filter 446 is attached immediately below the lower surface of the diffusion plate 444 in parallel therewith so as to cover the diffusion plate 444, the light projected from the light source 445 through the diffusion plate 444 passes through the polarizing filter 446 and becomes linearly polarized light, and is projected to the ink layer 411. Further, when the polarizing filter 446 is attached so as to cover the lower end opening of the upper housing 441-2, the camera 431 receives the light that is specularly reflected at the surface of the ink layer 411 and has passed through the polarizing filter 446. Accordingly, in the light projected from the light source 445 through the polarizing filter 446, the light component subjected to specular reflection at the ink layer 411 is received by the camera 431 through the polarizing filter 446. However, the light component that is diffused and reflected can be cut off by the polarizing filter 446, so as not to be received by the camera 431.

Since the imaging adapter illustrated in FIG. 33 has the polarizing filter 446, it is possible to reduce the diffused reflection light input to the camera 431, and consequently, to relatively emphasize the specular reflection light by the ink layer 411.

Further, since a single polarizing filter 446 is used as the polarizer and the analyzer that satisfy parallel nicols, the configuration is simplified. However, instead of the single polarizing filter 446, a polarizer in a donut shape that covers the diffusion plate 444 and an analyzer that covers the opening of the upper housing 441-2 at an arbitrary position may be used.

<Eighth Exemplary Configuration of Imaging Adapter>

Figure 34:
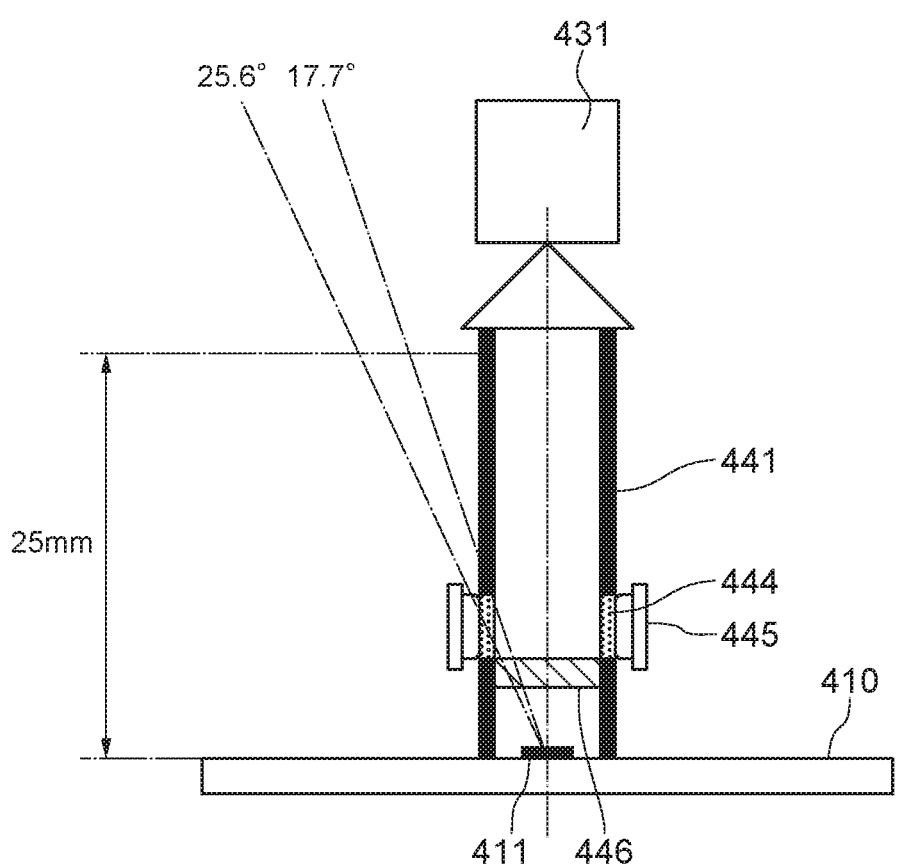
FIG. 34 is a side view illustrating an eighth exemplary configuration of the imaging adapter provided to the imaging unit of the object collation device according to the fourth exemplary embodiment of the present invention.

FIG. 34 is a side view illustrating an eighth exemplary configuration of the imaging adapter 412. The imaging adapter 412 illustrated in FIG. 34 has a structure in which a circular polarizing filter 446 is attached to the side closer to the ink layer 411 than the diffusion plate 444 formed on the side surface of the cylindrical housing 441, so as to cover the opening of the housing 441. In this point, the imaging adapter 412 is different from the imaging adapter illustrated in FIG. 31 not having such a polarizing filter 446. The other configurations are the same as those of the imaging adapter illustrated in FIG. 31.

When the circular polarizing filter 446 is attached to the side closer to the ink layer 411 than the diffusion plate 444 so as to cover the opening of the housing 441, the light projected from the light source 445 through the diffusion plate 444 passes through the polarizing filter 446 and becomes linearly polarized light, and is projected to the ink layer 411. The camera 431 receives the light that is specularly reflected at the surface of the ink layer 411 and has passed through the polarizing filter 446. Accordingly, in the light projected from the light source 445 through the polarizing filter 446, the light component subjected to specular reflection at the ink layer 411 is received by the camera 431 through the polarizing filter 446. However, the light component diffused and reflected is cut off by the polarizing filter 446, whereby it can be prevented from being received by the camera 431.

Since the imaging adapter illustrated in FIG. 34 has the polarizing filter 446, it is possible to reduce the diffused reflection light input to the camera 431, and consequently, to relatively emphasize the specular reflection light by the ink layer 411.

Further, since a single polarizing filter 446 is used as the polarizer and the analyzer that satisfy parallel nicols, the configuration is simplified. However, instead of the single polarizing filter 446, it is possible to use a polarizer in a donut shape arranged horizontally on the side closer to the ink layer 411 than the diffusion plate 444, and an analyzer that covers the opening of the housing 441 on the side closer to the ink layer 411 than the diffusion plate 444.

<Other Exemplary Configurations of Imaging Adapter>

To the imaging adapter illustrated in FIG. 28, a polarizing filter 446 similar to that illustrated in FIG. 32 may be attached. Alternatively, to the imaging adapter illustrated in FIG. 29, a polarizing filter 446 similar to that illustrated in FIG. 33 may be attached.

Next, an exemplary configuration of the image processing unit 433 of FIG. 22 will be described.

Figure 35:
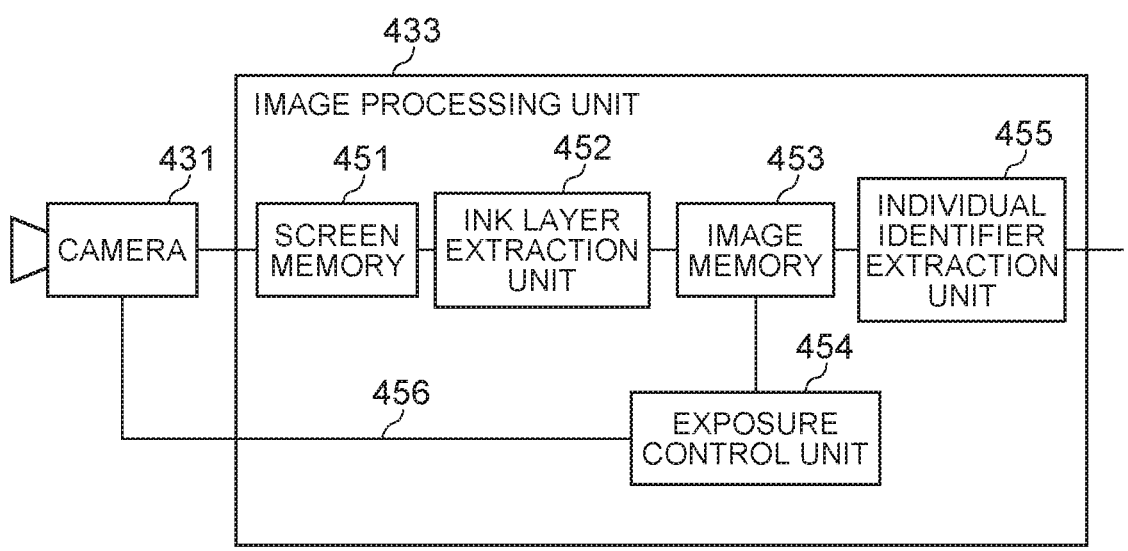
FIG. 35 is a diagram illustrating an exemplary configuration of an image processing unit provided to the imaging unit of the object collation device according to the fourth exemplary embodiment of the present invention.

FIG. 35 is a block diagram illustrating an exemplary configuration of the image processing unit 433. The image processing unit 433 of this example includes a screen memory 451, an ink layer extraction unit 452, an image memory 453, an exposure control unit 454, and an individual identifier extraction unit 455.

The screen memory 451 has a function of storing a frame image including an image of the ink layer 411 captured by the camera 431.

The ink layer extraction unit 452 has a function of extracting a partial image corresponding to the area of the ink layer 411 from the frame image stored in the screen memory 451. The ink layer extraction unit 452 extracts, based on a difference between the color and hue of the object 410 on which the ink layer 411 is formed and the color and hue of the ink layer 411, an image portion of the ink layer 411 through threshold processing (binarization processing) according to the color and hue that divide the two, for example. However, it is not limited to such a method.

Clustering in a feature space, a division merging method, or the like, known as an area division method of an image, may be used.

The image memory 453 has a function of storing a partial image corresponding to the area of the ink layer 411 extracted by the ink layer extraction unit 452.

The exposure control unit 454 has a function of controlling exposure of the camera 431, based on the brightness of the partial image corresponding to the area of the ink layer 411 that is stored in the image memory 453. For example, the exposure control unit 454 averages the pixel values in the area of the ink layer 411 to calculate average luminance of the partial image. Then, when the average luminance has a predetermined value, the exposure control unit 454 maintains the current exposure control amount, while when the average luminance is out of the predetermined value, the exposure control unit 454 calculates an exposure control amount that matches the predetermined value. In the case where the value of pixel luminance ranges from 0 to 256, the predetermined value may be 128, for example. Thereby, it is possible to increase the contrast of the uneven pattern on the surface of the ink layer 411. Then, the exposure control unit 454 transmits an exposure control signal 456 corresponding to the calculated exposure control amount, to the camera 431. The exposure control signal 456 may be a signal for regulating one of, two of, three of, or all of the aperture amount of the lens of the camera 431, shutter speed, frame rate, and a gain of an amplifier for amplifying a video signal.

The individual identifier extraction unit 455 has a function of acquiring, from the image memory 453, a partial image corresponding to the area of the ink layer 411 after the exposure control by the exposure control unit 454, and extracting the individual identifier of the object 410 from the acquired partial image.

Figure 36:
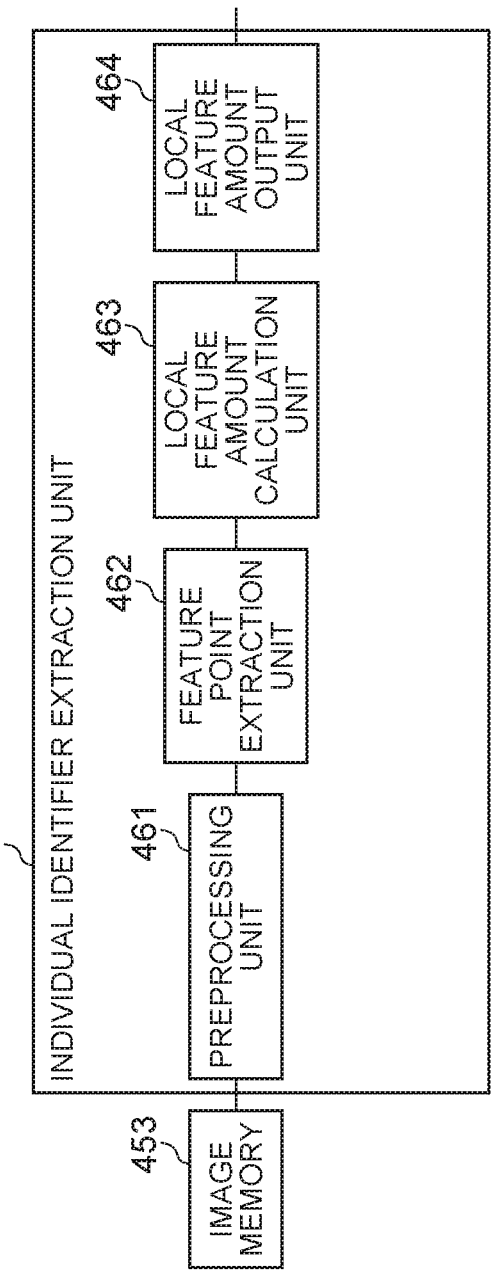
FIG. 36 is a diagram illustrating an exemplary configuration of an individual identifier extraction unit in the image processing unit provided to the imaging unit of the object collation device according to the fourth exemplary embodiment of the present invention.

FIG. 36 illustrates an exemplary configuration of the individual identifier extraction unit 455. The individual identifier extraction unit 455 of this example includes a preprocessing unit 461, a feature point extraction unit 462, a local feature amount calculation unit 463, and a local feature amount output unit 464.

The preprocessing unit 461 reads the partial image corresponding to the area of the ink layer 411 from the image memory 453, and performs preprocessing. Specifically, the preprocessing unit 461 first averages the pixel values in the area of the ink layer 411 to calculate the average color of the ink layer 411. For example, in the case of a color image in which the color of one pixel is expressed by a combination of three types of color information, that is, red, green, and blue, the preprocessing unit 461 calculates an average value of color information of red, green, and blue of all pixels in the area of the ink layer 411. Then, for each pixel in the area of the ink layer 411, the preprocessing unit 461 subtracts the calculated average value of the color information of red, green, and blue, from the color information of red, green blue of the pixel. Thereby, the weight of the color channel different from the ink color increases, so that it is possible to emphasize the light component specularly reflected at the surface of the ink layer 412.

The feature point extraction unit 462, the local feature amount calculation unit 463, and the local feature amount output unit 464 have functions similar to those of the feature point extraction unit 192, the local feature amount calculation unit 193, and the local feature amount output unit 194 of FIG. 13. That is, the feature point extraction unit 462 extracts characteristic points (feature points) existing at edges or corners from a partial image corresponding to the area of the ink layer 411 after the preprocessing. The local feature amount calculation unit 463 calculates, from the extracted feature point and the pixel value of a pixel in the vicinity thereof, the feature amount relating to the feature point (local feature amount). The local feature amount output unit 464 outputs the local feature amount, calculated by the local feature amount calculation unit 463, to the registration unit 402 as an individual identifier of the object 410.

As described above, according to the present embodiment, it is possible to realize an object collation apparatus and an object collation method that are simple and able to use individual difference between fine uneven patterns for authentication and collation. This is because a fine uneven pattern on the surface of an ink layer is used for individual identification of the object.

Fifth Exemplary Embodiment

Figure 37:
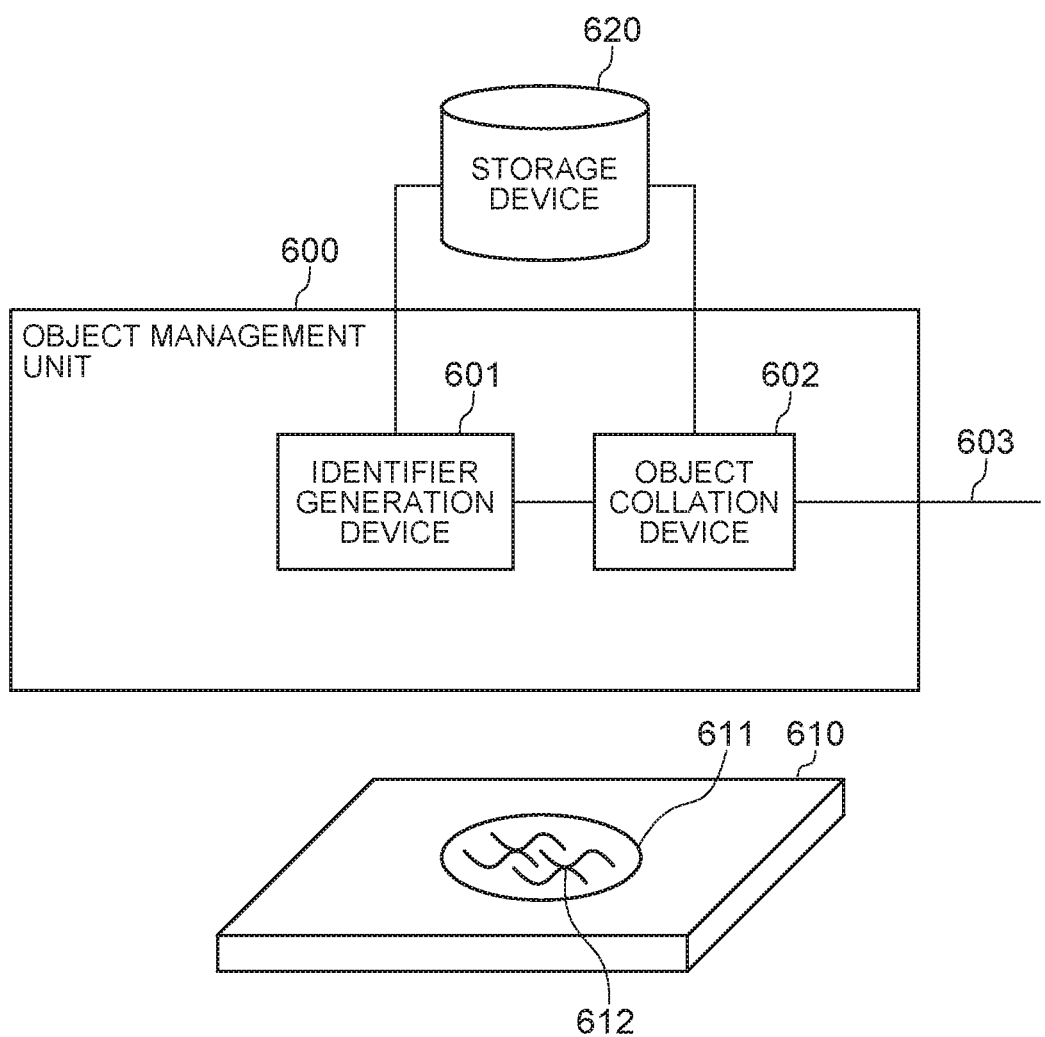
FIG. 37 is a diagram illustrating an exemplary configuration of an object management system according to a fifth exemplary embodiment of the present invention.

Referring to FIG. 37, an object management system 600 according to a fifth exemplary embodiment of the present invention has a function of managing an individual identifier for identification and collation of an object 610.

The object 610 is a target to be managed with an individual identifier given, such as an industrial product or a product packaging. FIG. 37 illustrates only one object 610 to be managed with an individual identifier given. However, a large number of objects 610 are subjected to be managed in general. In that case, a large number of objects 610 may be a set of objects of the same type having the same outer shape (such as certain electronic components produced on a production line), or a mixture of sets of objects of different types having different outer shapes and sizes (for example, electronic components or the like having different outer shapes and different functions produced in different production lines).

The object management system 600 is configured of an identifier generation device 601 and an object collation device 602.

The identifier generation device 601 has a function of forming an ink layer 611 on the object 610, a function of imaging an uneven pattern 612 on the surface of the ink layer 611, and a function of registering an individual identifier that is a result of the imaging into the storage device 620. The identifier generation device 601 is configured of the identifier generation device 100 according to the first exemplary embodiment of the present invention, for example.

The object collation device 602 has a function of imaging the uneven pattern 612 on the surface of the ink layer 611 formed on the object 610, and a function of recognizing the object 610 based on the image of the uneven pattern 612 obtained by imaging. The object collation device 602 is configured of the object collation device 400 according to the fourth exemplary embodiment of the present invention, for example.

Figure 38:
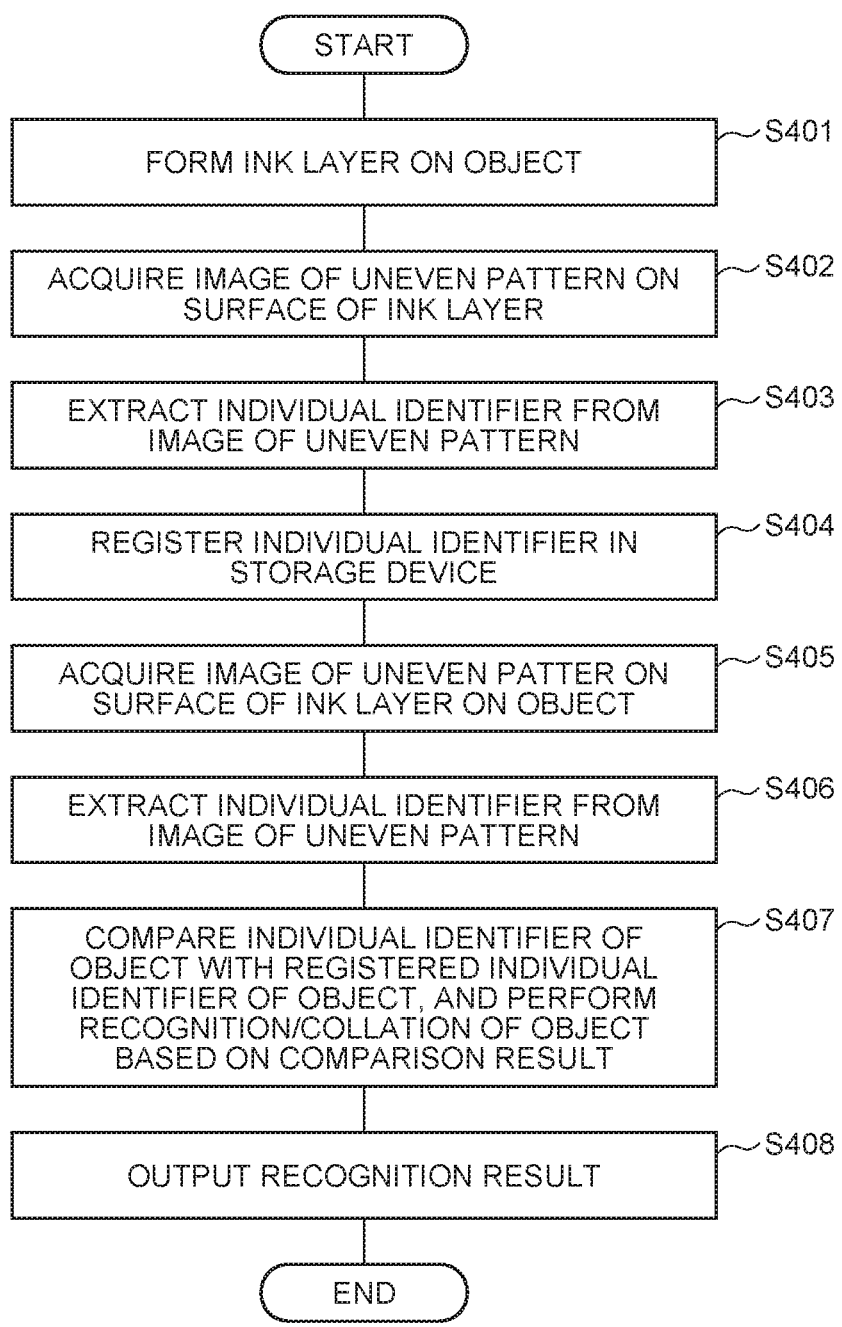
FIG. 38 is a flowchart illustrating a procedure of an object management method performed with use of the object management system according to the fifth exemplary embodiment of the present invention.

FIG. 38 is a flowchart illustrating a procedure of an individual identifier management method to be performed using the object management system 600. Hereinafter, the object management method according to the present embodiment will be described with reference to FIGS. 37 and 38.

First, the identifier generation device 601 forms an ink layer 611 on the object 610 (S401). Then, the identifier generation device 601 images the uneven pattern 612 on the surface of the ink layer 611 formed on the object 610, and acquires an image of the uneven pattern 612 (S402). Then, the identifier generation device 601 extracts an individual identifier from the acquired image of the uneven pattern (S403). Then, the identifier generation device 601 registers the extracted individual identifier in the storage device 620, as an individual identifier of the object 610.

Meanwhile, the object collation device 602 images the uneven pattern 612 on the surface of the ink layer 611 formed on the object 610, and acquires an image of the uneven pattern 612 (S405). Then, the object collation device 602 extracts an individual identifier from the acquired image of the uneven pattern 612 (S406). Then, the object collation device 602 compares the extracted individual identifier with the individual identifier of the object registered in the storage device 620, and based on the comparison result, performs recognition and collation of the object 610 (S407). Then, the object collation device 602 outputs a result of the recognition and the collation (S408).

In the flowchart of FIG. 38, subsequent to the processing of steps S401 to S404 by the identifier generation device 601, processing of steps S405 to S408 by the object collation device 602 is performed. However, the procedure is not limited thereto. It is possible to repeat the processing of steps S401 to S404 by the identifier generation device 601 a plurality of times on different objects 610. It is also possible to repeat the processing of steps S405 to S408 by the object collation device 602 a plurality of times on different objects 610. Alternatively, it is possible to perform the processing of steps S401 to S404 by the identifier generation device 601 and the processing of steps S405 to S408 by the object collation device 602 in parallel on different objects 610.

As described above, according to the present embodiment, it is possible to realize an object management system and an object management method that are simple and able to use individual difference of fine uneven patterns for authentication and collation. This is because a fine uneven pattern on the surface of an ink layer is used for individual identification of the object.

Sixth Exemplary Embodiment

Figure 39:
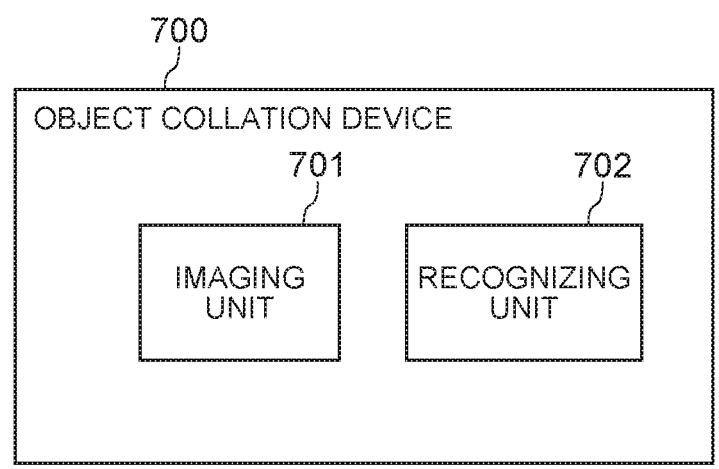
FIG. 39 is a diagram illustrating an exemplary configuration of an object collation device according to a sixth exemplary embodiment of the present invention.

Referring to FIG. 39, an object collation device 700 according to a sixth exemplary embodiment of the present invention includes an imaging unit 701 and a recognizing unit 702.

The imaging unit 701 has a function of imaging an uneven pattern to acquire an image of an uneven pattern on the surface of an ink layer formed on an object not illustrated. The imaging unit 701 also has a function of extracting an individual identifier from the acquired image of the uneven pattern. The imaging unit 701 may have a configuration similar to that of the imaging unit 401 of FIG. 20, for example. However, it is not limited thereto.

The recognizing unit 702 has a function of comparing the individual identifier of the object extracted by the imaging unit 701 with a registered individual identifier of the object stored in the storage unit not illustrated, and based on the comparison result, performing identification and collation of the object. The recognizing unit 702 may have a configuration similar to that of the recognizing unit 402 of FIG. 20, for example. However, it is not limited thereto.

The object collation device 700 according to the present embodiment configured as described above operates as described below. The imaging unit 701 of the object collation device 700 images an uneven pattern on the surface of an ink layer formed on an object not illustrated, to acquire an image thereof. Then, the imaging unit 701 extracts an individual identifier from the image of the uneven pattern that is acquired through imaging. Then, the recognizing unit 702 compares the individual identifier of the object extracted by the imaging unit 701 with a registered individual identifier of the object stored in a storage unit not illustrated, and based on the comparison result, performs determination of identification and collation of the object.

As described above, according to the present embodiment, it is possible to realize an individual identifying device and an individual identifying method that are simple and able to use individual difference between fine uneven patterns for authentication and collation. This is because a fine uneven pattern on the surface of an ink layer is used for individual identification of the object.

While the present invention has been described with reference to the exemplary embodiments described above, the present invention is not limited to the above-described embodiments. The form and details of the present invention can be changed within the scope of the present invention in various manners that can be understood by those skilled in the art.

INDUSTRIAL APPLICABILITY

The present invention can be used in the field of recognition, authentication, and collation of an object. In particular, the present invention is applicable to the field of forming an uneven pattern on an object, and performing authentication and collation of an object by the uneven pattern.

The whole or part of the exemplary embodiments disclosed above can be described as, but not limited to, the following supplementary notes.
[Supplementary Note 1]
  An object collation device comprising:
  an imaging unit that images an uneven pattern on a surface of an ink layer formed on a target object; and
  a recognizing unit that recognizes the target object based on an image of the uneven pattern obtained by imaging.
[Supplementary Note 2]
  The object collation device according to supplementary note 1, wherein
  the imaging unit includes:
  a light source that emits light to the surface of the ink layer from four oblique sides at a predetermined angle from a normal direction directly opposite to the ink layer;
  a housing in which a direction other than a direction of the light source, as seen from the ink layer, is a dark area; and
  a camera that receives light emitted from the light source and specularly reflected at the surface of the ink layer, and acquires the uneven pattern as a contrast image.
[Supplementary Note 3]
  The object collation device according to supplementary note 2, wherein the direction of the light source, as seen from the ink layer, is at an angle ranging from 17.7° to 25.6° from the normal direction.
[Supplementary Note 4]
  The object collation device according to supplementary note 2 or 3, wherein
  as the light source, a ring-shaped light source is used.
[Supplementary Note 5]
  The object collation device according to any of supplementary notes 2 to 4, wherein
  the housing has an opening for observing the ink layer from the camera, and an opening for emitting light from the light source to the ink layer, and the housing is in a tubular shape having a black inner surface.

[Supplementary Note 6]

The object collation device according to any of supplementary notes 2 to 5, wherein the housing is in a truncated conical shape tapering toward a lower end.

[Supplementary Note 7]

The object collation device according to any of supplementary notes 2 to 6, wherein the housing further includes an analyzer that converts the light emitted from the light source into linearly polarized light and makes the linearly polarized light incident on the ink layer, and a polarizer that transmits light specularly reflected at the surface of the ink layer and makes the light incident on the camera.

[Supplementary Note 8]

The object collation device according to supplementary note 7, wherein the polarizer and the analyzer are configured of one polarizing filter.

[Supplementary Note 9]

The object collation device according to any of supplementary notes 2 to 8, wherein as the light source, a light source having radiation intensity in which spectral distribution is high in a wavelength band of low spectral reflectance in a spectral reflectance characteristic of the ink layer is used.

[Supplementary Note 10]

The object collation device according to any of supplementary notes 2 to 9, wherein the imaging unit further includes an image processing unit that performs processing to subtract, from a value of each pixel of a color image of the uneven pattern acquired by the camera, a value corresponding to an average color of the ink layer.

[Supplementary Note 11]

The object collation device according to any of supplementary notes 2 to 10, wherein the imaging unit further includes an image processing unit that detects a partial image corresponding to an area of the ink layer from the image acquired by the camera, and performs exposure control of the camera based on brightness of the partial image.

[Supplementary Note 12]

The object collation device according to any of supplementary notes 1 to 11, wherein the uneven pattern includes crater-like irregularities randomly formed on the surface of the ink layer by a cratering phenomenon, each of the crater-like irregularities having a diameter equal to or larger than 10 μm but equal to or smaller than 100 μm.

[Supplementary Note 13]

An identifier generation device comprising:

a generation unit that forms an ink layer on a target object;

an imaging unit that images an uneven pattern on a surface of the ink layer; and a registration unit that registers an imaged result.

[Supplementary Note 14]

The identifier generation device according to supplementary note 13, wherein the generation unit uses a fast-drying ink to form the ink layer.

[Supplementary Note 15]

The identifier generation device according to supplementary note 13 or 14, wherein the generation unit applies ink to a same position of the target object within a short time to form the ink layer.

[Supplementary Note 16]

The identifier generation device according to any of supplementary notes 13 to 15, wherein after applying ink to the target object, the generation unit rapidly heats the ink applied.

[Supplementary Note 17]

The identifier generation device according to any of supplementary notes 13 to 16, wherein the imaging unit acquires an image of the uneven pattern after the uneven pattern is stabilized.

[Supplementary Note 18]

The identifier generation device according to any of supplementary notes 13 to 17, wherein the imaging unit includes a determination unit that determines whether or not the uneven pattern is stabilized.

[Supplementary Note 19]

The identifier generation device according to supplementary note 18, wherein the determination unit performs determination based on time-series images of the uneven pattern obtained by imaging the uneven pattern in a time series manner after generation of the ink layer.

[Supplementary Note 20]

The identifier generation device according to supplementary note 18, wherein the determination unit performs determination based on a result of comparing a number of feature points extracted from a plurality of images included in time-series images of the uneven pattern obtained by imaging the uneven pattern in a time-series manner after generation of the uneven pattern, with a reference value.

[Supplementary Note 21]

The identifier generation device according to supplementary note 20, wherein the imaging unit acquires the image in which the number of the feature points is larger than the reference value, as an image after the uneven pattern is stabilized.

[Supplementary Note 22]

The identifier generation device according to supplementary note 18, wherein the determination unit performs determination based on a result of comparing, with each other, pieces of information related to a plurality of feature points extracted from a plurality of images included in time-series images of the uneven pattern obtained by imaging the uneven pattern in a time-series manner after generation of the ink layer.

[Supplementary Note 23]

The identifier generation device according to supplementary note 18, wherein the imaging unit acquires, as an image after the uneven pattern is stabilized, a temporally subsequent image from which information related to a plurality of feature points is extracted, the information being almost equal to information related to a plurality of feature points extracted from a temporally preceding image.

[Supplementary Note 24]

The identifier generation device according to supplementary note 18, wherein the determination unit performs determination based on whether or not a predetermined time passed from generation of the ink layer.

[Supplementary Note 25]

An object management system comprising an identifier generation device and an object collation device, wherein the identifier generation device includes:

a generation unit that forms an ink layer on a target object;

an imaging unit that images an uneven pattern on a surface of the ink layer; and a registration unit that registers an imaged result in a storage unit, and the object collation device includes:
an imaging unit that images the uneven pattern on the surface of the ink layer formed on the target object; and
a recognizing unit that recognizes the target object based on an image of the uneven pattern obtained by imaging.

[Supplementary Note 26]

An object collation method comprising:
imaging an uneven pattern on a surface of an ink layer formed on a target object; and
recognizing the target object based on an image of the uneven pattern obtained by the imaging.

[Supplementary Note 27]

An identifier generation method comprising:
forming an ink layer on a target object;
imaging an uneven pattern on a surface of the ink layer; and
registering a result of the imaging in a storage unit.

[Supplementary Note 28]

An object management method comprising an identifier generation step and an object collation step, wherein
the identifier generation step includes:
forming an ink layer on a target object;
imaging an uneven pattern on a surface of the ink layer; and
registering a result of the imaging in a storage unit, and the object collation step includes:
imaging the uneven pattern on the surface of the ink layer formed on the target object; and
recognizing the target object based on an image of the uneven pattern obtained by the imaging.

[Supplementary Note 29]

A program for causing a computer to function as
a recognizing unit that recognizes a target object based on an image of an uneven pattern acquired by imaging the uneven pattern on a surface of an ink layer formed on the target object.

[Supplementary Note 30]

An imaging adapter mountable on a camera that images an uneven pattern on a surface of an ink layer formed on an object, the imaging adapter comprising:
a light source that emits light to the surface of the ink layer from four oblique sides at a predetermined angle from a normal direction directly opposite to the ink layer; and
a housing in which a direction other than a direction of the light source, as viewed from the ink layer, is a dark area, the housing receiving light that is emitted from the light source and is specularly reflected at the surface of the ink layer, the housing having an opening for observing the uneven pattern as a contrast image.

REFERENCE SIGNS LIST 100 identifier generation device
101 generation unit
102 imaging unit
103 registration unit
110 object
111 ink layer
112 uneven pattern
120 storage unit
122 housing
123 nib portion
124 ink
127 cap
131 ink supply unit
142 ink-jet nozzle
143 drive unit
144 ink tank
151 plate
152 ink supply unit
153 return spring
154 piston rod
155 drive unit
156 limit switch
157 connecting member
161 camera
162 detection unit
163 determination unit
164 image processing unit
171 image acquisition unit
172 feature point extraction unit
173 local feature amount calculation unit
174 reference value storage unit
175 feature point storage unit
176 local feature amount storage unit
177 comparison unit
178 collation unit
179 collation unit
180 determination result output unit
181 timer
191 image acquisition unit
192 feature point extraction unit
193 local feature amount calculation unit
194 local feature amount output unit
200 identifier generation device
201 generator
202 imager
203 dryer
204 controller
205 conveyor belt
206 conveyor belt drive
207 light switch
208 light switch
209 storage device
210 object
211 ink layer
300 identifier generation device
301 leg
302 outer casing
303 plate
304 ink supply unit
305 imager
306 dryer
307 return spring
308 rotary shaft
309 stepping motor
310 piston rod
311 drive unit
312 controller
313 operation button
314 LED
315 power source
400 object collation device
401 imaging unit
402 recognizing unit
410 object
411 ink layer
412 uneven pattern
420 storage unit
430 recognition result
431 camera
432 imaging adapter
433 image processing unit 441 housing
441-1 lower housing
441-2 upper housing
442 opening
443 opening
444 diffusion plate
445 light source
446 polarizing filter
451 screen memory
452 ink layer extraction unit
453 image memory
454 exposure control unit
455 individual identifier extraction unit
461 preprocessing unit
462 feature point extraction unit
463 local feature amount calculation unit
464 local feature amount output unit
500 computer
501 arithmetic processing unit
502 storage unit
503 program
600 object management system
601 identifier generation device
602 object collation device
603 recognition result
610 object
611 ink layer
612 uneven pattern
620 storage device
700 object collation device
701 imaging unit
702 recognizing unit

The invention claimed is:

1. An object collation device comprising:
an imaging unit that images an uneven pattern on a surface of an ink layer formed on a target object; and
a recognizing unit that recognizes the target object based on an image of the uneven pattern obtained by imaging, wherein
the imaging unit includes:
a light source that emits light to the surface of the ink layer from four oblique sides in a range from a first angle to a second angle, wherein the first angle is less than the second angle, and wherein the first angle and the second angle are defined by a zenith angle with reference to a normal direction directly opposite to the ink layer;
a camera that receives light emitted from the light source and specularly reflected at the surface of the ink layer, and acquires the uneven pattern as a contrast image; and
a housing in which a direction of a range from the first angle to a third angle corresponding to a position of the camera, wherein the third angle is less than the first angle, and a direction of a range from the second angle to an angle of 90 degrees defined by the zenith angle are dark areas.

2. The object collation device according to claim 1, wherein
the housing includes a polarizer that converts the light emitted from the light source into linearly polarized light and makes the linearly polarized light incident on the ink layer, and an analyzer that transmits light specularly reflected at the surface of the ink layer and makes the light incident on the camera.

3. The object collation device according to claim 2, wherein
the polarizer and the analyzer are configured of one polarizing filter.

4. The object collation device according to claim 1, wherein
as the light source, a light source having radiation intensity in which spectral distribution is high in a wavelength band of low spectral reflectance in a spectral reflectance characteristic of the ink layer is used.

5. The object collation device according to claim 1, wherein
the imaging unit further includes
an image processing unit that performs processing to subtract, from a value of each pixel of a color image of the uneven pattern acquired by the camera, a value corresponding to an average color of the ink layer.

6. The object collation device according to claim 1, wherein
the uneven pattern includes crater-like irregularities randomly formed on the surface of the ink layer by a cratering phenomenon, each of the crater-like irregularities having a diameter equal to or larger than 10 μm but equal to or smaller than 100 μm.

7. The object collation device according to claim 1, wherein the first angle is 17.7° and the second angle is 25.6°.

* * * * *